United States Patent
Wiberg et al.

(10) Patent No.: US 9,014,079 B2
(45) Date of Patent: Apr. 21, 2015

(54) INTRA-SUBFRAME TIME MULTIPLEXING

(75) Inventors: Niclas Wiberg, Linköping (SE); Håkan Andersson, Linköping (SE); Christian Hoymann, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 930 days.

(21) Appl. No.: 12/712,413

(22) Filed: Feb. 25, 2010

(65) Prior Publication Data

US 2011/0103291 A1 May 5, 2011

Related U.S. Application Data

(60) Provisional application No. 61/256,017, filed on Oct. 29, 2009.

(51) Int. Cl.
*H04B 7/14* (2006.01)
*H04B 7/155* (2006.01)

(52) U.S. Cl.
CPC .................. *H04B 7/15542* (2013.01)

(58) Field of Classification Search
CPC .................................... H04B 7/15542
USPC ................ 370/315, 329, 336; 455/456.1, 561
See application file for complete search history.

(56) References Cited

U.S. PATENT DOCUMENTS

| | | | |
|---|---|---|---|
| 2006/0153147 A1* | 7/2006 | Chillariga et al. | 370/337 |
| 2007/0155315 A1* | 7/2007 | Lee et al. | 455/11.1 |
| 2008/0240719 A1* | 10/2008 | Kim et al. | 398/96 |
| 2009/0075588 A1* | 3/2009 | Zhu et al. | 455/18 |
| 2010/0238845 A1* | 9/2010 | Love et al. | 370/280 |
| 2010/0260068 A1* | 10/2010 | Bhatt et al. | 370/254 |
| 2011/0222428 A1* | 9/2011 | Charbit et al. | 370/252 |

OTHER PUBLICATIONS

3GPP TSG-RAN WG2 #68: HARQ Operation far Relaying, Ericcson document R2-096762, Oct. 9-13, 2009, Jeju, Korea.*
International Search Report and Written Opinion mailed Jun. 21, 2010 in corresponding PCT Application No. PCT/SE2010/050238.
Ericsson et al, "HARQ Operation for Relaying" 3GPP Draft; R2-096762 HARQ Operation for Relaying, $3^{rd}$ Generation Partnership Project (3GPP), Mobile Conference Center; Oct. 9, 2009.

(Continued)

*Primary Examiner* — Pao Sinkantarakorn
*Assistant Examiner* — Richard Chang

(57) ABSTRACT

A relay node (29) radio access network (RAN) is configured to communicate using backhaul subframes over a Un radio interface with a donor base (27) station node and to communicate using access subframes over a Uu radio interface with a wireless terminal (30). Downlink backhaul subframes and downlink access subframes are transmitted over an air interface using the same frequency band, but a beginning of a selected downlink access subframe precedes a beginning of a next-in-time downlink backhaul subframe by a downlink timing advance (TA). The relay node (29) both receives downlink control information from the donor base station node and transmits downlink control information to the wireless terminal during the downlink backhaul subframe, e.g., during a time to which the downlink backhaul subframe has been allocated.

20 Claims, 12 Drawing Sheets

(56) References Cited

OTHER PUBLICATIONS

Motorola, "Summary of Design Considerations for Supporting Relays in TDD and FDD Modes", 3GPP Draft, R1-090807, 3rd Generation Partnership Project (3GPP), Mobile Conference Center; Feb. 16, 2009.

Catt, "Design of Relay Backhaul Control Channels in LTE-A", 3GPP Draft, R1-094151, 3rd Generation Partnership Project (3GPP), Mobile Conference Center; Oct. 12, 2009.

Texas Instruments, "On the Design of Relay Node for LTE-Advanced" 3GPP Draft, R1-090593, 3rd Generation Partnership Project (3GPP), Mobile Conference Center; Feb. 3, 2009.

Ericsson, "HARQ and Control Signaling for Relaying", 3GPP Draft, R2-095804, 3rd Generation Partnership Project (3GPP), Mobile Conference Center; Oct. 12, 2009.

3GPP TS 36.331, "3rd Generation Partnership Project; Technical Specification Group Radio Access Network; Evolved Universal Terrestrial Radio Access (E-UTRA); Radio Resource Control (RRC); Protocol Specification," V9.5.0, Dec. 2010.

International Preliminary Report on Patentability mailed May 10, 2010 in PCT Application No. PCT/SE2010/050238.

* cited by examiner

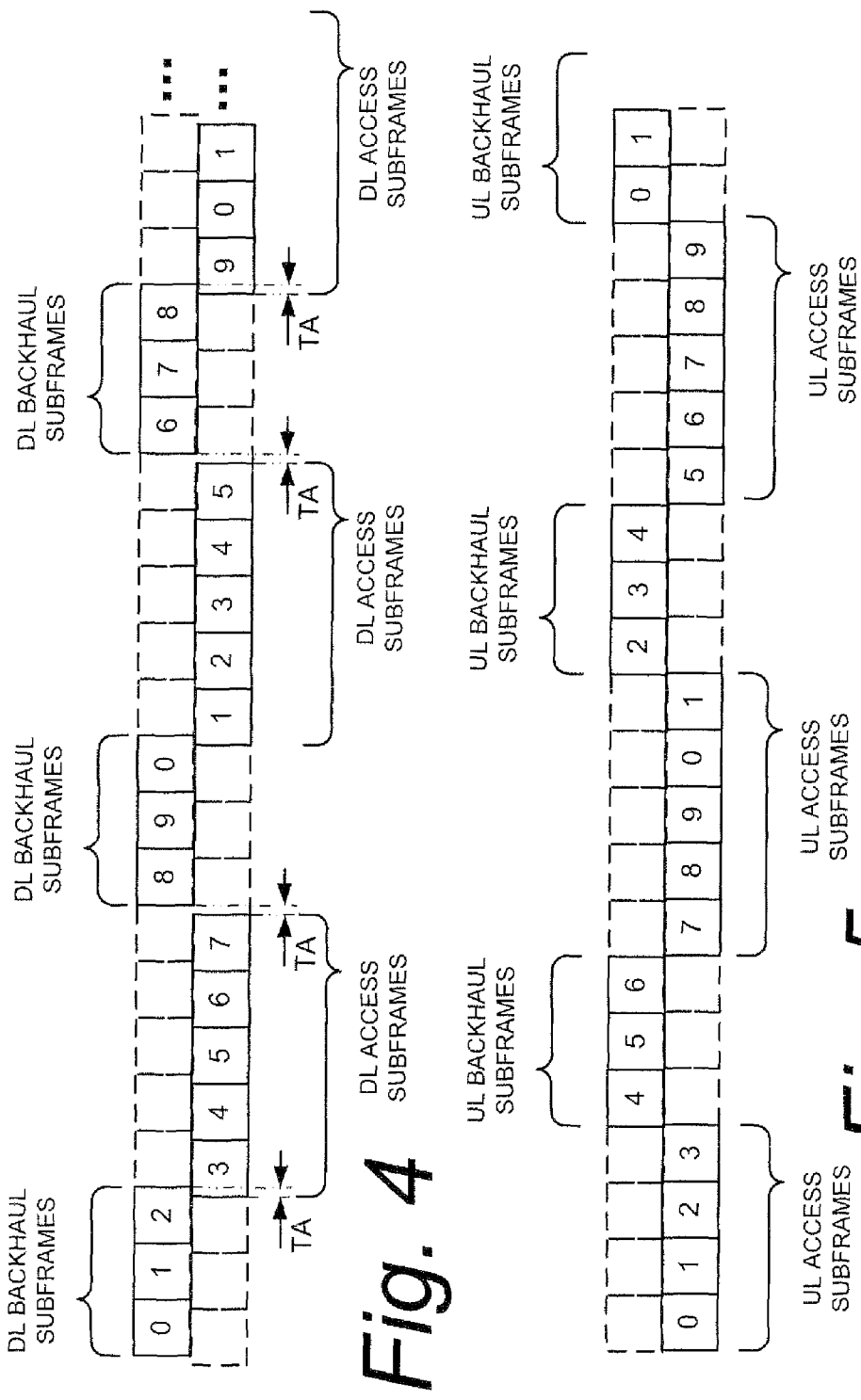

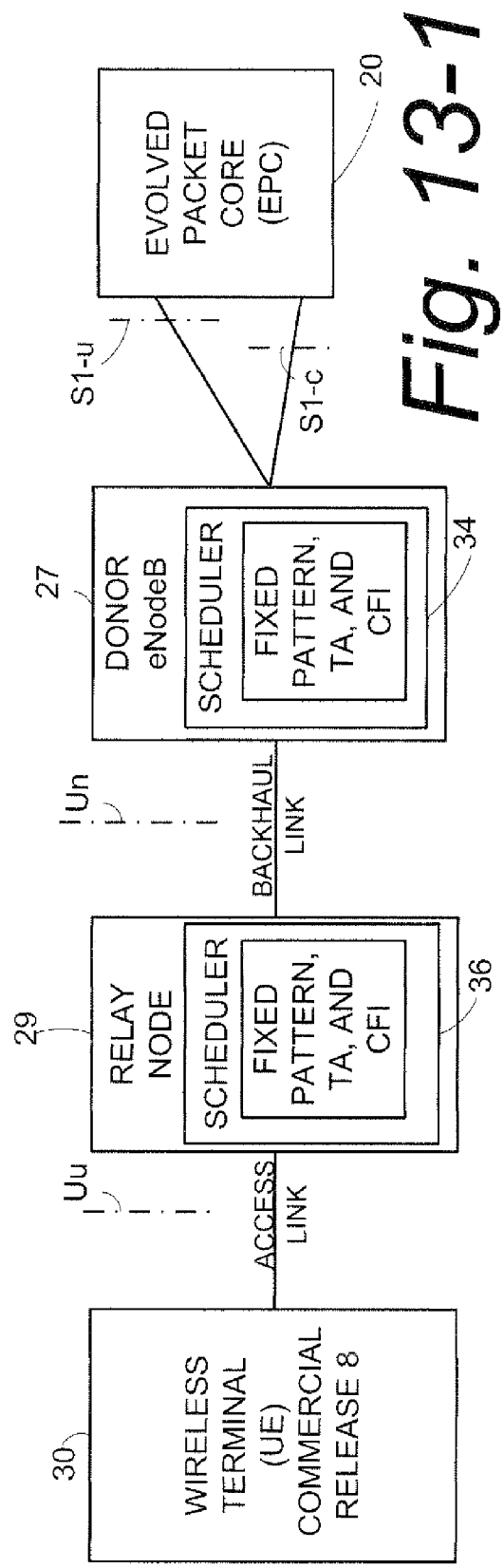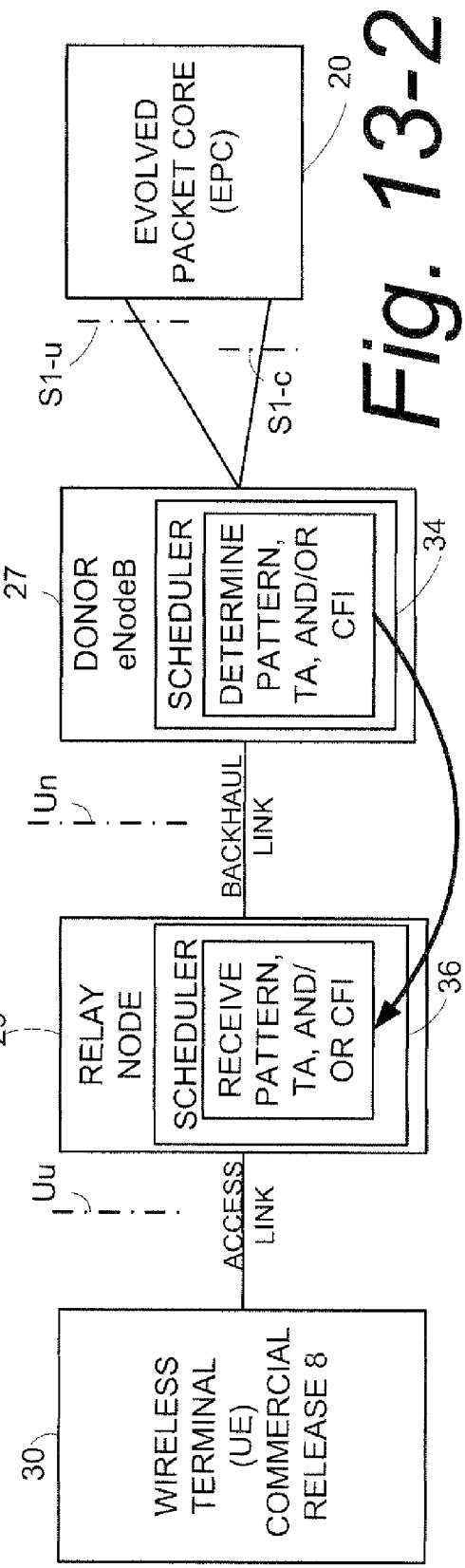

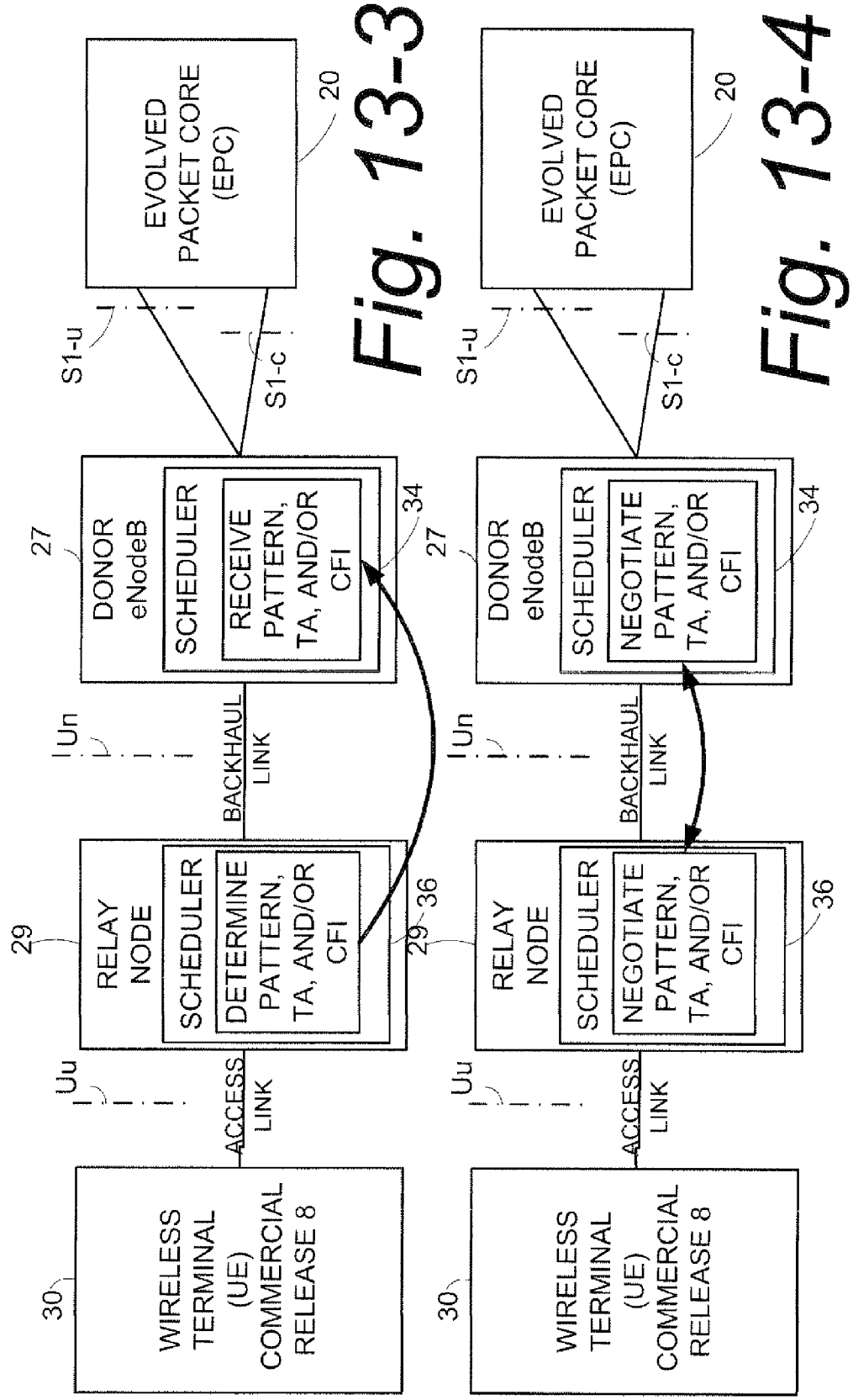

INTRA-SUBFRAME TIME MULTIPLEXING

This application claims the priority and benefit of U.S. Provisional patent Application 61/256,017 filed Oct. 29, 2009, entitled "INTRA-SUBFRAME TIME MULTIPLEXING", which is incorporated herein by reference in its entirety.

BACKGROUND

This invention pertains to telecommunications, and particularly to generation and handling of frames for single-frequency networks In a typical cellular radio system, wireless terminals (also known as mobile stations and/or user equipment units (UEs)) communicate via a radio access network (RAN) to one or more core networks. The wireless terminals can be mobile stations or user equipment units (UE) such as mobile telephones ("cellular" telephones) and laptops with wireless capability (e.g., mobile termination), and thus can be, for example, portable, pocket, hand-held, computer-included, or car-mounted mobile devices which communicate voice and/or data via radio access network.

The radio access network (RAN) covers a geographical area which is divided into cell areas, with each cell area being served by a base station, e.g., a radio base station (RBS), which in some networks is also called "NodeB" or "B node". A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions (particularly earlier versions) of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for user equipment units (UEs). The Third Generation Partnership Project (3GPP) has undertaken to evolve further the UTRAN and GSM based radio access network technologies.

Specifications for the Evolved Universal Terrestrial Radio Access Network (E-UTRAN) are ongoing within the 3$^{rd}$ Generation Partnership Project (3GPP). The Evolved Universal Terrestrial Radio Access Network (E-UTRAN) comprises the Long Term Evolution (LTE) and System Architecture Evolution (SAE).

Long Term Evolution (LTE) is a variant of a 3GPP radio access technology wherein the radio base station nodes are connected directly to a core network rather than to radio network controller (RNC) nodes. In general, in LTE the functions of a radio network controller (RNC) node are performed by the radio base station nodes. As such, the radio access network (RAN) of an LTE system has an essentially "flat" architecture comprising radio base station nodes without reporting to radio network controller (RNC) nodes.

The evolved UTRAN (E-UTRAN) comprises evolved base station nodes, e.g., evolved NodeBs or eNodeBs or eNBs, providing evolved UTRA user-plane and control-plane protocol terminations toward the user equipment unit (UE). The eNB hosts the following functions (among other functions not listed): (1) functions for radio resource management (e.g., radio bearer control, radio admission control), connection mobility control, dynamic resource allocation (scheduling); (2) selection of a mobility management entity (MME) when no routing to an MME can be determined from the information provided by the user equipment unit (UE); and (3) User Plane functions, including IP Header Compression and encryption of user data streams; termination of U-plane packets for paging reasons, and switching of U-plane for support of UE mobility. The eNB hosts the PHYsical (PHY), Medium Access Control (MAC), Radio Link Control (RLC), and Packet Data Convergence Protocol (PDCP) layers that include the functionality of user-plane header-compression and encryption. The eNodeB also offers Radio Resource Control (RRC) functionality corresponding to the control plane. The eNodeB performs many functions including radio resource management, admission control, scheduling, enforcement of negotiated UL QoS, cell information broadcast, ciphering/deciphering of user and control plane data, and compression/decompression of DL/UL user plane packet headers.

Inband relays are being discussed in 3GPP for future LTE releases. As shown in FIG. 1, an inband relay involves a donor base station node sending subframes of information using a given frequency band and over an air interface to a relay node. The link between the donor base station node and the relay node has been referred to as the backhaul link. The relay node in turn uses the same frequency band to send subframes of information to a wireless terminal (UE).

The in-band relay configuration requires the relay node to have antennas that are receiving subframes on a downlink from the donor base station node while also having antennas that transmit subframes on a downlink to the wireless terminal (UE). Since both the reception from the donor base station node and the transmission to the wireless terminal (UE) involve the same frequency band, a problem with inband relays is avoidance of self-interference from transmitting antennas to receiving antennas in the relay node.

Time multiplexing between the backhaul and access links has been proposed as an approach to solving the self-interference issue. However, a problem with time multiplexing is that 3GPP specifications allow wireless terminals (UE) to normally assume that the base station transmits certain physical signals in each subframe, meaning that the relay node needs to transmit in each subframe.

Multicast/broadcast single-frequency network (MBSFN) operation involves simultaneous transmission of the exact same waveform from multiple cells, over a single frequency. In this way the wireless terminal (UE) receiver perceives the multiple MBSFN cells as one large cell. Also, instead of inter-cell interference from neighboring cell transmissions, the wireless terminal experiences constructive superpositioning of the signals transmitted from multiple MBSFN cells.

It has been proposed in 3GPP to assign and signal some subframes as so-called "MBSFN" subframes. The definition of the MBSFN subframe pattern is included in the System Information Block Type 2 (Specified in 3GPP document 36.331, "Radio Resource Control (RRC) Protocol Specification"). Signaling some subframes as "MBSFN" subframes has the effect of telling the wireless terminal (UE) that only a control region of those subframes is transmitted. The portion of those "MBSFN" subframes that is not transmitted from the relay node can then be used for downlink communication over the backhaul link. MBSFN subframe patterns can be configured with different periods, for instance 10 and 40 ms periods are possible.

The possibilities for specifying some subframes as "MBSFN" are limited. Each 10 ms radio frame consists of 10 subframes numbered 0 ... 9. Moreover, in Frequency-Division Duplex (FDD) mode only subframes 1, 2, 3, 6, 7, 8 can be marked as "MBSFN". In a Time-Division Duplex (TDD) mode, only subframe numbers 2, 3, 4, 7, 8, 9, can be marked as "MBSFN" subframe.

In an FDD system, the LTE Hybrid Automatic Request for Retransmission (HARQ) transmission scheme is (to a large extent) designed with the intent of an 8 ms (8 subframes) periodic operation. In particular, as shown by way of example in FIG. 2, uplink HARQ retransmissions are always performed an integer multiple of 8 ms after the original transmission, generating a desired uplink transmission pattern of period 8 ms. Furthermore, downlink signals that are needed to support uplink transmissions (scheduling grants and HARQ ACK/NACKs) need to be transmitted 4 subframes before or 4 subframes after the corresponding uplink transmission, generating a similar desired downlink transmission pattern of period 8 ms. Further, for each downlink transmission, a corresponding ACK/NACK is transmitted in the uplink 4 subframes later.

SUMMARY

In accordance with an aspect of the technology disclosed herein, within a regular non-MBSFN DL subframe, the relay node switches between transmit and receive mode making it possible to transmit certain mandatory signals from the relay while in the same subframe receiving certain control information and/or data over the backhaul from the donor eNodeB, without causing TX/RX self-interference in the relay node.

In its various and alternate aspects the technology disclosed herein concerns a radio access network (RAN); a donor base station node; a relay node; and methods of operating each. The relay node is configured to communicate using backhaul subframes over a Un radio interface with the donor base station node and to communicate using access subframes over a Uu radio interface with a wireless terminal. Downlink backhaul subframes and downlink access subframes are transmitted over an air interface using the same frequency band, but a beginning of a selected downlink access subframe precedes a beginning of a next-in-time downlink backhaul subframe by a downlink timing advance. The relay node is configured both to receive downlink control information from the donor base station node and to transmit downlink control information to the wireless terminal during the downlink backhaul subframe, e.g., during a time to which the downlink backhaul subframe has been allocated.

In accordance with one aspect of the technology disclosed herein, plural downlink backhaul subframes and plural downlink access subframes occur in a first pattern known both to the relay node and the donor base station node. The first pattern is preferably periodic, and preferably has a period of eight subframes.

As a further and distinct aspect of the technology disclosed herein, the relay node is further configured to communicate using uplink backhaul subframes over the Un radio interface with a donor base station node and to communication using uplink access subframes over the Uu radio interface with the wireless terminal Plural uplink backhaul subframes and plural uplink access subframes occur in a second pattern in a second frequency band over the air interface. The second frequency band is different from the first frequency band and the second pattern is preferably a time shift of the first pattern.

In an example embodiment and mode, the downlink control information received by the relay node from the donor base station node during the downlink backhaul subframe comprises a control format indicator (CFI) and a Physical Downlink control Channel (PDCCH), and wherein the CFI specifies the number of symbols occupied by the PDCCH.

In an example embodiment and mode, a value of the timing advance is chosen to accommodate a first predetermined number of downlink backhaul symbols and two switch times in a second predetermined number of symbols of the downlink backhaul subframe. A value of the CFI specifies the first predetermined number. In an example embodiment and mode, the timing advance is 1.5 (OFDM) symbols and the value of CFI is two.

In an example embodiment and mode, the downlink control information received by the relay node from the donor base station node during the downlink backhaul subframe further comprises a reference signal (RS) and a Physical Hybrid ARQ Indicator Channel (PHICH).

In an example embodiment and mode, the relay node is configured to transmit a reference signal (RS) and a control format indicator (CFI) to the wireless terminal during the timing advance. The CFI specifies the number of symbols occupied by a Physical Downlink control Channel (PDCCH).

In an example embodiment and mode, the relay node is configured to receive the downlink control information from the donor base station node in first and second symbols of the downlink backhaul subframe. The relay node transmits downlink control information (different downlink control information than that received from the donor base station node) to the wireless terminal during certain symbols (symbols 1, symbols 1-2, or symbols 1-3, inclusive) of the downlink access subframe.

In an example embodiment and mode, the relay node is configured to transmit a reference signal (RS), synchronization signals, and a Physical Broadcast Channel (PBCH) during the downlink access subframe.

In some example embodiments and modes, the relay node is configured to receive the downlink control information from the donor base station node in first and second symbols of the downlink backhaul subframe; to receive a Physical Downlink Shared Channel (PDSCH channel) during selected symbols of the downlink backhaul subframe; and to transmit different downlink control information to the wireless terminal during selected symbols of the downlink access subframe. In an example implementation of such embodiments and modes, the donor base station node is configured to format the Physical Downlink Shared Channel (PDSCH channel) whereby contents of the PDSCH can be entirely decoded during a first part of the subframe. In another example implementation of such embodiments and modes, the donor base station node is configured to adjust interleaving of the Physical Downlink Shared Channel (PDSCH channel) whereby data of any given symbol in the PDSCH are spread over all PDSCH symbols of the subframe. The relay node is configured to be aware of the formatting used for the PDSCH.

In an example embodiment and mode, the relay node comprises a relay node scheduler; a relay node subframe handler; and a relay node subframe generator. The relay node scheduler is configured to operate the relay node in accordance with a pattern of plural downlink backhaul subframes and plural downlink access subframes. The relay node subframe handler is configured to process the downlink control information received from the donor base station node during the downlink backhaul subframe. The relay node subframe generator is configured to generate the downlink access subframe which is to be transmitted to the wireless terminal and to include, in selected symbols of the downlink access subframe, appropriate downlink control information (different downlink control information than that received from the donor base station node).

In another of its aspects, the technology disclosed herein concerns a donor base station node of a radio access network. The donor base station node being configured to communicate using downlink backhaul subframes including downlink control information over a Un radio interface with a relay node. The downlink backhaul subframes belong to a first pattern comprising plural downlink backhaul subframes and plural downlink access subframe. Downlink backhaul subframes and downlink access subframes are transmitted over an air interface using the same frequency band, but a beginning of a selected downlink access subframe precedes a beginning of a next-in-time downlink backhaul subframe by a downlink timing advance. The donor base station node is configured to coordinate transmission of the downlink backhaul subframes according to the first pattern with the relay node.

In an example embodiment and mode, the donor base station node comprises a donor base station node scheduler; a donor base station node subframe handler; and a donor base station node subframe generator. The donor base station node scheduler is configured to operate the donor base station node in accordance with the first pattern. The donor base station node subframe handler is configured to process uplink subframes received from the relay node. The donor base station node subframe generator is configured to generate the downlink backhaul subframes which include downlink control information which is to be transmitted to the relay node.

In another of its aspects the technology disclosed herein concerns a method of operating a radio access network (RAN) comprising a donor base station node and a relay node. The relay node is configured to communicate using backhaul subframes over a Un radio interface with the donor base station node and to communicate using access subframes over a Uu radio interface with a wireless terminal. The method comprises transmitting the downlink backhaul subframes and the downlink access subframes over an air interface using the same frequency band; providing a downlink timing advance between a beginning of a selected downlink access subframe and a beginning of a next-in-time downlink backhaul subframe; and configuring the relay node both to receive downlink control information from the donor base station node and to transmit downlink control information to the wireless terminal during the downlink backhaul subframe.

In an example embodiment and mode, the method further comprises coordinating in both the relay node and the donor base station node a first predetermined pattern of plural downlink backhaul subframes and plural downlink access subframes. In an example implementation, the method comprises coordinating the first predetermined pattern by preconfiguring the relay node and the donor base station node with the first predetermined pattern. In another example implementation the method comprises coordinating the first predetermined pattern by signaling the first predetermined pattern between the relay node and the donor base station node. In yet another example implementation the method comprises coordinating the first predetermined pattern by signaling the first predetermined pattern to the relay node and the donor base station node from another node.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4 is a diagrammatic view of an example pattern of downlink (DL) backhaul and downlink (DL) access subframes.

FIG. 5 is a diagrammatic view of an example pattern of uplink (UL) backhaul and uplink (UL) access subframes, shifted four subframes later compared to the downlink pattern of FIG. 3.

FIG. 10 is a diagrammatic view of an example TX/RX pattern in an MBSFN subframe according to an example embodiment of the technology disclosed herein.

FIG. 11 is a diagrammatic view of an example pattern of MBSFN subframes for a radioframeAllocationPeriod.

FIG. 13-1 through FIG. 13-5 are diagrammatic views illustrating different ways in which information such as subframe pattern(s), timing advance, and Control Format Indicator [CFI] can be determined and/or communicated in differing example embodiments.

DETAILED DESCRIPTION

Figure 1:
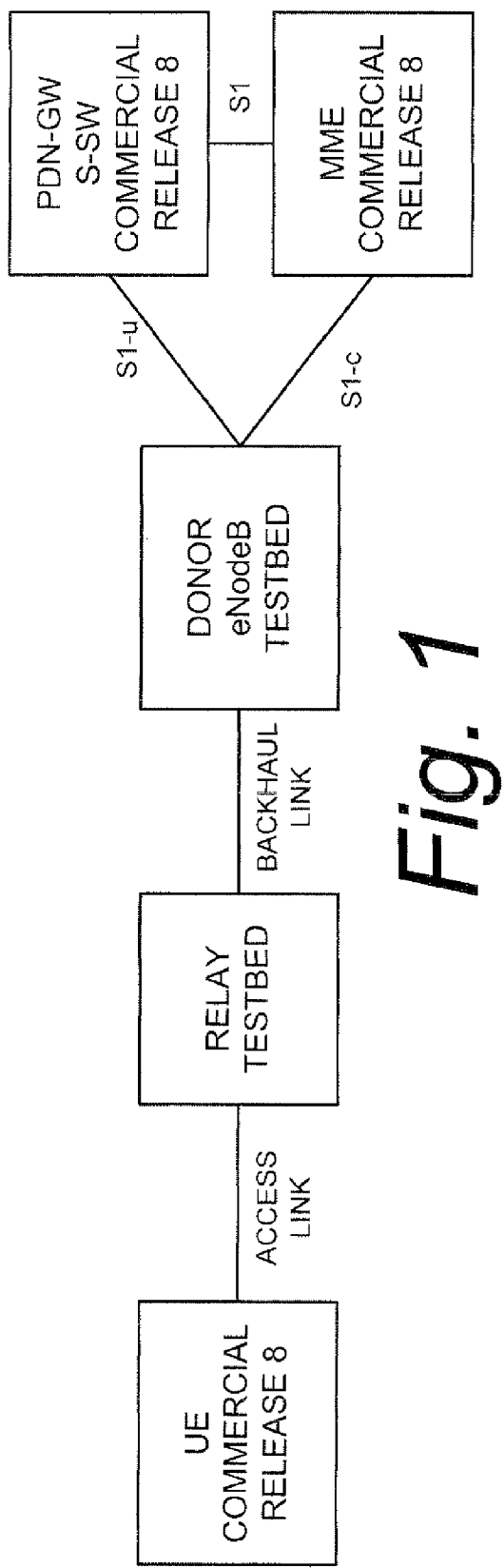
FIG. 1 is a diagrammatic view of a communications system including inband relaying and comprising a donor base station node and a relay node.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

In accordance with the technology disclosed herein, within a regular non-MBSFN DL subframe, a relay node switches between transmit and receive mode making it possible to transmit certain mandatory signals from the relay while in the same subframe receiving certain control information and/or data over the backhaul from the donor eNodeB, without causing TX/RX self-interference in the relay node.

Figure 3:
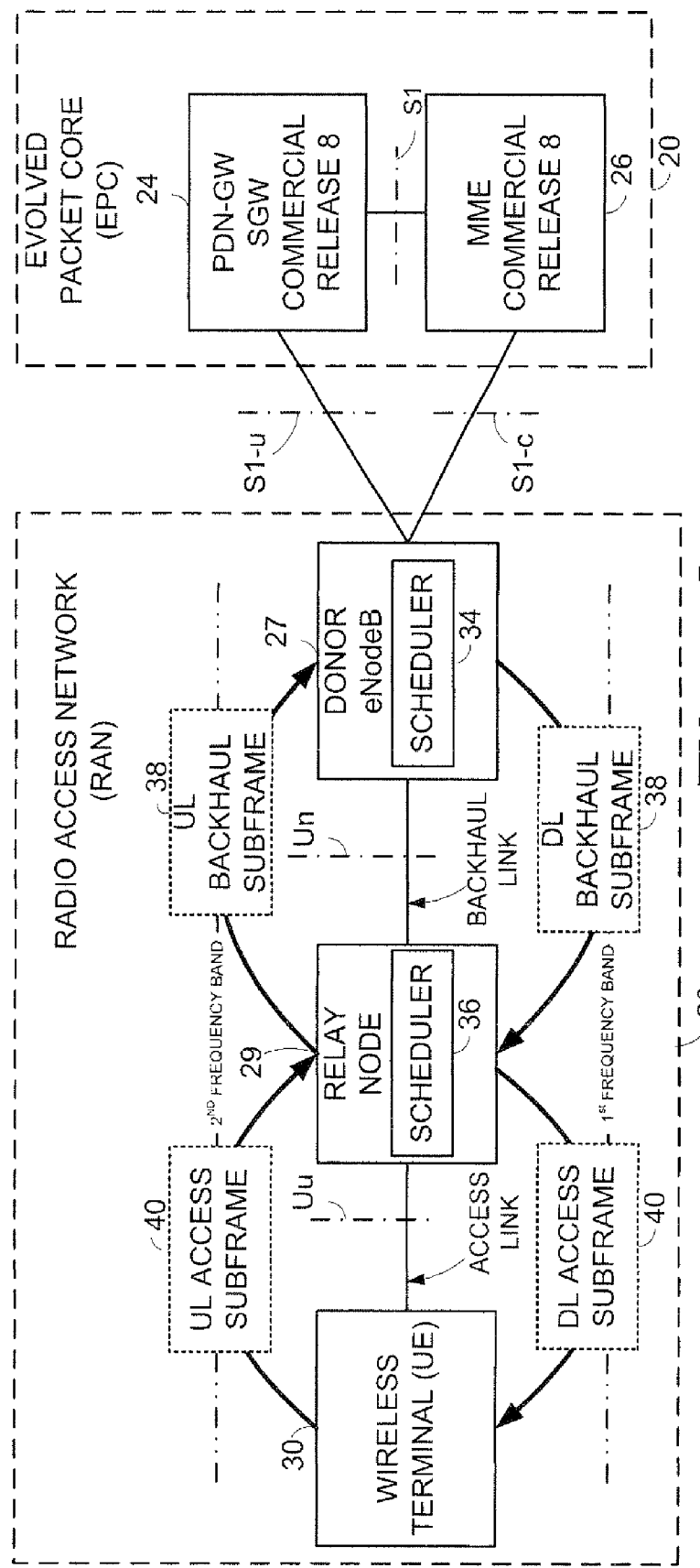
FIG. 3 is a diagrammatic view of a communications system including a donor base station node and a relay node according to an example embodiment.

FIG. 3 shows portions of an example, non-limiting telecommunications network comprising evolved packet core (EPC) 20 and radio access network (RAN) 22. The evolved packet core (EPC) 20 in turn comprises serving gateway (SGW) 24 and can include or, if not including, connect to mobility management entity (MME) 26, as well other unillustrated entities and nodes. The evolved packet core (EPC) 20 connects to radio access network (RAN) 22 over an interface known as the S1 interface. The mobility management entity (MME) 26 communicates over interface S1-$c$ with donor base station node 27; the mobility management entity (MME) 26 communicates over interface S11 with serving gateway (SGW) 24; and the serving gateway (SGW) 24 and base station node 27 communicate over interface S1$u$. The S1-$c$ interface is a reference point for the control plane protocol between EUTRAN and MME. The protocol over this reference point is eRANAP and it uses Stream Control Transmission Protocol (SCTP) as the transport protocol. The S1-$u$ interface is a reference point between EUTRAN and SGW for the per-bearer user plane tunneling and inter-eNB path switching during handover. The transport protocol over the S1$u$ interface is GPRS Tunneling Protocol-User plane (GTP-U).

The radio access network (RAN) 22 comprises at least one donor base station node 27, also known as donor eNodeB. The donor base station node 27 connects to evolved packet core (EPC) 20 over the S1 interface. The donor base station node 27 communicates with relay node 29 over an interface known as the Un interface. In some instances the relay node 29 can also be referred to as a relay base station. The relay node 29 in turn communicates with wireless terminal 30 over an interface known as the Uu interface. Both the Un interface and the Uu interface exist over a radio or air interface, e.g., are radio interfaces. It should be understood that relay node 29 can serve plural wireless terminals, only one such wireless terminal being shown, and may even serve plural cells.

FIG. 3 further shows that the relay node 29 is configured in a backhauled situation in which relay node 29 is connected to donor base station node 27 over the Un interface. As such, donor base station node 27 is positioned between mobility management entity (MME) 26 and relay node 29, and likewise donor base station node 27 is positioned between the serving gateway (SGW) 24 and base station node 27.

The relay node is configured to communicate using backhaul subframes over a Un radio interface with the donor base station node and to communicate using access subframes over a Uu radio interface with one or more wireless terminals, one such wireless terminal 30 being illustrated in FIG. 3. As used herein, "wireless terminal(s)" can be mobile stations or user equipment units (UE) such as mobile telephones ("cellular" telephones) and laptops with wireless capability (e.g., mobile termination), and thus can be, for example, portable, pocket, hand-held, computer-included, or car-mounted mobile devices which communicate voice and/or data via radio access network.

FIG. 3 shows that downlink backhaul subframes are transmitted from the donor base station node 27 to the relay node 29 and downlink access subframes are transmitted from the relay node 29 to the wireless terminal 30 over an air interface using the same frequency band. The transmission of the downlink backhaul subframes and the downlink access subframes over the same frequency band is controlled and coordinated by functionalities such as schedulers which reside at donor base station node 27 and relay node 29. To this end, FIG. 3 shows example embodiments of donor base station node scheduler 34 and relay node scheduler 36.

The coordination of donor base station node scheduler 34 and relay node scheduler 36 permits relay node 29 both to receive downlink control information from the donor base station node (in a downlink backhaul subframe) and to transmit downlink control information to the wireless terminal (in a downlink access subframe 40) during the downlink backhaul subframe, e.g., during a time to which the downlink backhaul subframe has been allocated. In FIG. 3, a representative backhaul subframe is shown as downlink backhaul subframe 38 and a representative downlink access subframe is shown as downlink access subframe 40. As explained herein and illustrated, e.g., by FIG. 6, such dual activity by relay node 29 is facilitated, e.g., by a beginning of a selected downlink access subframe preceding a beginning of a next-in-time downlink backhaul subframe by a downlink timing advance.

One aspect of the technology disclosed pertains to a pattern of downlink subframes. As used herein, the pattern of downlink subframes is also referred to as the "first pattern". The pattern of downlink subframes includes a subpattern of downlink (DL) backhaul subframes by/through which relay node 29 can receive downlink transmissions from donor base station node 27. Since in 3GPP the backhaul link between donor base station node 27 and relay node 29 is referred to as Un interface, these backhaul subframes are also called Un subframes. The remaining subframes of the first pattern are considered as downlink access subframes. Since in 3GPP the access link is referred to as Uu interface, these access subframes are also called Uu subframes. Thus, the first pattern comprises plural downlink subframes, with some of the subframes of the first pattern being downlink backhaul subframes and others of the subframes of the first pattern being downlink access subframes. The particular placement of the downlink backhaul subframes in the first pattern forms the subpattern of downlink backhaul subframes; and the particular placement of the downlink access subframes in the first pattern forms the subpattern of downlink access subframes. The pattern of downlink subframes (known as the first pattern) is preferably periodic and can have, for example, a period of 8 subframes, as illustrated in example manner by FIG. 4. A period of 8 subframes facilitates better compatibility with the roundtrip time of the retransmission scheme.

The donor base station node 27 uses only downlink backhaul subframes (such as representative downlink backhaul subframe 38) for transmissions dedicated to the relay node 29. The donor base station node 27 uses only downlink access subframes (such as representative downlink access subframe 40) for transmissions of data to its connected wireless terminals (UEs). A pattern of MBSFN subframes is defined, and the pattern of MBSFN subframes is typically a subset of the downlink backhaul subframes.

In addition to downlink subframes, uplink subframes are also transmitted in the backhaul relay situation of FIG. 3. As shown in FIG. 3, uplink access subframes (such as representative uplink access subframe 42) are transmitted over the Uu interface from wireless terminal 30 to relay node 29 and uplink backhaul subframes (such as representative uplink backhaul subframe 44) are transmitted over the Un interface from relay node 29 to donor base station node 27. Whereas the downlink backhaul subframes and the downlink access subframes are transmitted on the same frequency band (referred to herein as the "first frequency band"), the uplink access subframes and uplink backhaul subframes are transmitted on the same frequency band (the "second frequency band"), which is different from the first frequency band.

Figures 5, 13:
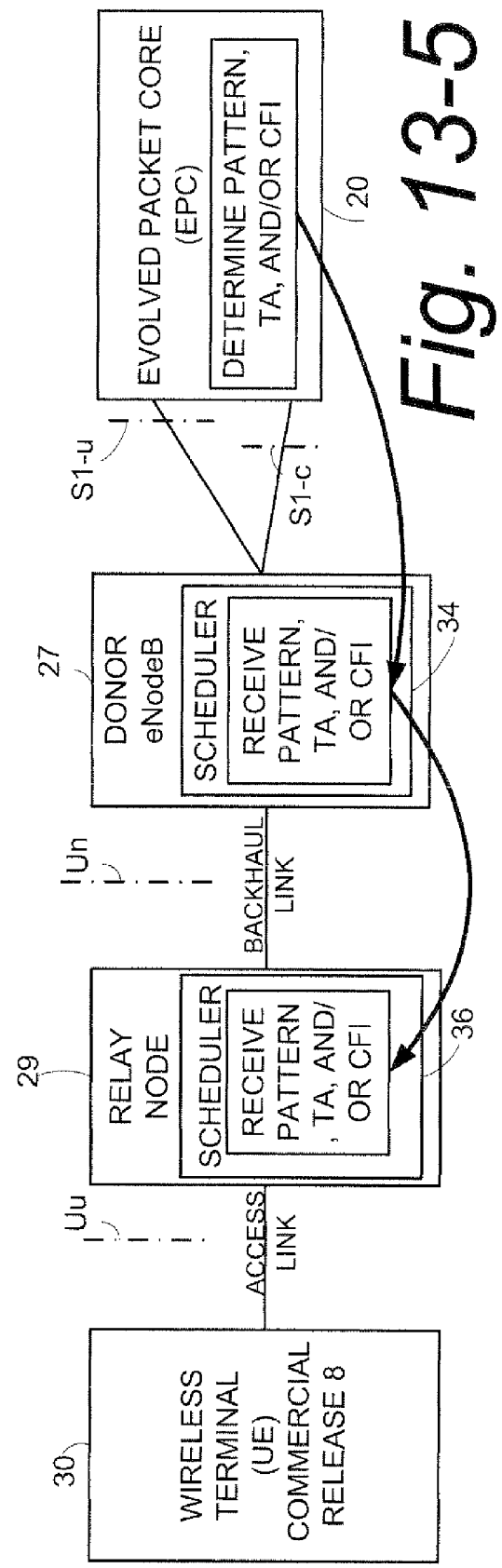

An example second pattern (of uplink subframes) is illustrated in FIG. 5, which shows the second pattern as comprising uplink access subframes and uplink backhaul subframes. In similar manner as the first pattern, the particular placement of the uplink backhaul subframes in the second pattern forms a subpattern of uplink backhaul subframes and the particular placement of the uplink access subframes in the second pattern forms a subpattern of uplink access subframes. The pattern of uplink subframes (known as the second pattern) is preferably periodic and can have, for example, a period of 8 subframes, as illustrated in example manner by FIG. 5. Moreover, as shown by a comparison of FIG. 5 and FIG. 4, the uplink backhaul pattern is preferably shifted 4 subframes later compared to the downlink backhaul pattern.

In conjunction with the uplink transmissions, donor eNodeB 27 only schedules relay node 29 for transmissions (using the Physical Uplink Shared Channel [PUSCH] or the Physical Uplink Control Channel [PUCCH]) on uplink backhaul subframes. The relay node 29 only schedules its connected wireless terminals for uplink transmissions (using the Physical Uplink Shared Channel [PUSCH] or the Physical Uplink Control Channel [PUCCH]) on uplink access subframes.

As stated previously, the downlink access subframes and the downlink backhaul subframes are transmitted on the same frequency band (the first frequency band) and the uplink access subframes and the uplink backhaul subframes are transmitted on the same frequency band (the second frequency band). The second frequency band has different frequencies and thus is different from the first frequency band. Moreover, two different types of frames (such as the downlink access subframes and the downlink backhaul subframes) using the same frequency band do not require or imply that the constituent carriers of the same frequency band are necessarily assigned in the same way by the respective nodes from which the subframes emanated. For example, although both use the first frequency band for the downlink, the relay node 29 may allocate or assign carriers of the first frequency band in different manner (e.g., independently) than does the donor base station node 27. Similarly, although both use the second frequency band for the uplink, the relay node 29 may allocate or assign carriers of the second frequency band in different manner than does the donor base station node 27.

Moreover, it should be understood that relay node 29 is a relay, which is different from a repeater. A repeater simply repeats the symbols it receives, possibly with amplification. A relay, on the other hand, decodes the data it receives, corrects the received data if necessary, and re-encodes the data for relaying on the access downlink. The signal transmitted by relay node 29 is thus not a copy of the signal it receives, but is instead a new signal that represents the data to be relayed, which was earlier received by relay node 29. In fact, there can be a significant and variable delay between reception and transmission of relayed data. That is, there can be considerable delay between reception by relay node 29 of data in a downlink backhaul subframe before a re-encoded representation of that data is transmitted by the relay node 29 in a downlink access subframe to the wireless terminal.

Figure 6:
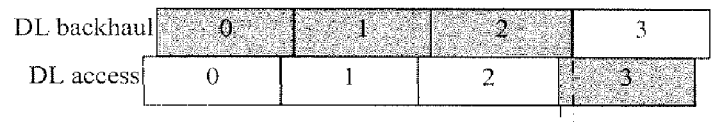
FIG. 6 is a diagrammatic view of an example downlink timing advance.

As another aspect of the technology disclosed herein, a downlink timing advance is introduced, such that relay node 29 transmits the access downlink signal slightly before the beginning of the corresponding backhaul downlink subframe. As illustrated in FIG. 4 and FIG. 6, downlink backhaul subframes and downlink access subframes are transmitted over an air interface using the same frequency band, but a beginning of a selected downlink access subframe precedes a beginning of a next-in-time downlink backhaul subframe by a downlink timing advance. In FIG. 4 and FIG. 6, the timing advance is denoted by TA. Although shown only for the first downlink access subframes in each grouping of five consecutive downlink access subframes, it should be understood that the timing advance TA occurs for each downlink access subframe. The timing advance TA is a fraction of a subframe, typically 1-3 OFDM symbols.

Figure 7:
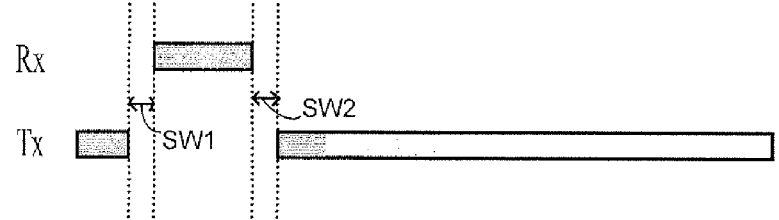
FIG. 7 is a diagrammatic view of an example transmit/receive (TX/RX) pattern at a relay node.
Figure 8:
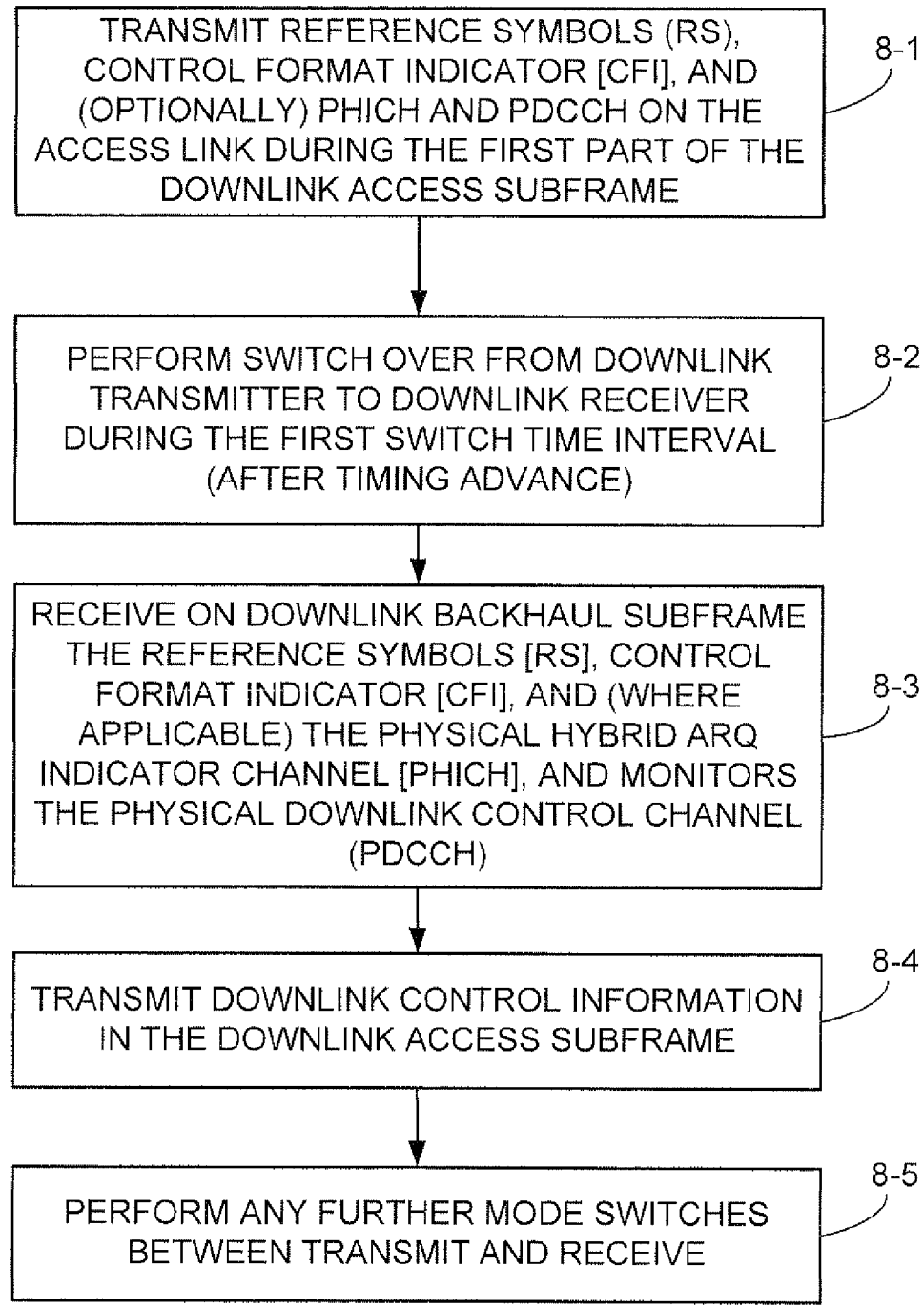
FIG. 8 is a flowchart showing in generic fashion various example or representative acts or steps that are can be performed by a relay node performance of various transmit and receive operations.

FIG. 7 shows a first example transmit (TX) and receive (RX) pattern at relay node 29 and serves as a basis for understanding operation of relay node 29 as well as the downlink subframe coordination between donor base station node 27 and relay node 29 according to an example embodiment and mode. FIG. 7 particularly shows an example embodiment wherein Physical Downlink Shared Channel [PDSCH] transmissions are not scheduled in the downlink backhaul subframes. FIG. 8 shows, in conjunction with FIG. 7 but also in more generic fashion, various example or representative acts or steps that are performed by relay node 29 including its relay node scheduler 36 in performance of various transmit and receive operations described herein.

In downlink backhaul subframes that are not MBSFN subframes, as act 8-1 relay node 29 first transmits the Reference Symbols (RS), the Control Format Indicator [CFI], and potentially PHICH and PDCCH, on the access link during the first part of the downlink access subframe. The Reference Symbols (RS) that are transmitted from relay node 29 and donor base station node 27 are different, since relay node 29 and donor base station node 27 have different cell identities. The Control Format Indicator [CFI] is discussed below.

FIG. 7 explicitly shows transmission of the Reference Symbols (RS) and the Control Format Indicator [CFI] (with CFI shown as being equal to 1 in FIG. 7) during a first transmit interval of the downlink access subframe. Transmission of the Reference Symbols (RS) and the Control Format Indicator [CFI] are shown as requiring one symbol (symbol 0) of the downlink access subframe of FIG. 7. It will be remembered that relay node 29 does not repeat the Reference Symbols (RS) received from donor base station node 27, but rather produces its own unique Reference Symbols (RS) based on its own cell identity (the Reference Symbols (RS) from donor base station node 27 may be used for channel estimation to improve the decoding of the transmitted data).

FIG. 7 further shows a first switch time interval (SW1) that follows the transmission of the first symbol of the downlink access subframe. The first switch time interval (SW1) is the length of time required for the relay node 29 to turn off its downlink transmitter and turn on its downlink receiver, and is illustrated by a first set of two broken vertical lines in FIG. 7. Act 8-2 of FIG. 8 shows relay node 29 performing a switch over from downlink transmitter to downlink receiver during the first switch time interval.

After turning on its downlink receiver, relay node 29 starts to monitor the downlink backhaul link (e.g., a downlink backhaul subframe) which has been transmitted by donor base station node 27. In so doing and as indicated by act 8-3 of FIG. 8, relay node 29 receives on downlink backhaul subframe the Reference Symbols [RS], Control Format Indicator [CFI], and (where applicable) the Physical Hybrid ARQ Indicator Channel [PHICH], and monitors the Physical Downlink Control Channel (PDCCH). The RS, CFI, PHICH, and PDCCH are shown as occupying symbols 0 and 1 of the downlink backhaul subframe of FIG. 7, and the time of receiving these quantities is shown by the receive interval of FIG. 7.

After the first part of the downlink backhaul subframe has been received on the backhaul link as just described, relay node 29 stops the downlink receiver and changes over to start its downlink transmitter. The changeover is reflected by the second switch time interval (SW2), which is the length of time required for the relay node 29 to turn off its downlink receiver and turn on its downlink transmitter, and is illustrated by a second set of two broken vertical lines in FIG. 6. Act 8-4 of FIG. 8 illustrates performing the switch-over from downlink receiver to downlink transmitter during the second switch time interval.

After turning on its downlink transmitter, relay node 29 starts transmitting the RS and (where applicable) the Primary Synchronization Signal [PSS] and/or the Secondary Synchronization Signal [SSS] and/or the Physical Broadcast Channel [PBCH], and potentially also the Physical Downlink Shared Channel [PDSCH]. Act 8-4 of FIG. 8 illustrates the transmissions of downlink control information in the downlink access subframe.

The foregoing operation is illustrated in example manner in FIG. 7, which shows a transmit/receive (TX/RX) pattern at relay node 29. From the foregoing it can be seen that relay node 29 is indeed configured both to receive downlink control information from the donor base station node and to transmit downlink control information to the wireless terminal during the downlink backhaul subframe, e.g., during a time to which the downlink backhaul subframe has been allocated. For example, during the time of the downlink access subframe the relay node 29 both receives downlink control information from the donor base station node (e.g., the RS, CFI, PHICH, and PDCCH of symbols 0 and 1 of the downlink backhaul subframe of FIG. 7) during the time that the downlink backhaul subframe has been allocated, and also transmits downlink control information to the wireless terminal during the downlink backhaul subframe, e.g., transmits in symbols 4-13 of the downlink access subframe during a time corresponding to allocation of the downlink backhaul subframe.

FIG. 7 further illustrates that, in accordance with an aspect of the technology disclosed herein, within a regular non-MBSFN downlink subframe, the relay node 29 switches between transmit and receive mode, thereby making it possible to transmit certain mandatory signals from the relay node 29 to the wireless terminal while in the same subframe receiving certain control information and/or data over the backhaul from the donor eNodeB, without causing TX/RX self-interference in the relay node 29. It is said that the transmission and receiving are in the "same" subframe in the sense that the subframes from relay node 29 and donor base station node 27 are essentially overlapping, the difference from complete overlap being the timing advance TA.

As represented by act 8-6 of the generic method of FIG. 6, further mode switches (e.g., between transmit and receive) can be performed by relay node 29. An example of further switching operations is subsequently illustrated in conjunction with FIG. 9.

Since the timing advance is a relative measure between the subframes of the DeNB and the relay it can be measured using any reference point that is well specified. It is, e.g., convenient, to use the beginning of the subframes as the reference point. The instant in time when a subframe begins at the relay node 29 can be viewed as the clock in the system and provides a reference in time. The timing advance TA that relay node 29 should exhibit must be compared to the timing of its donor base station node 27. In the example scenario of FIG. 7, the downlink timing advance TA is 1.5 OFDM symbols. In an example embodiment and mode, a value of the timing advance TA is chosen to accommodate a first predetermined number of downlink backhaul symbols and two switch times in a second predetermined number of symbols of the downlink backhaul subframe. A value of the CFI specifies the first predetermined number. Thus, in the example embodiment and mode of FIG. 7, the timing advance is 1.5 (OFDM) symbols and the value of CFI is two. In conjunction with the timing advance, symbol(s) 0 (and possibly also 1) of the backhaul downlink arrives at relay node 29 when its DL frame timing has reached symbols 1-3, as is illustrated in FIG. 7.

From the foregoing it is thus understood that, as another aspect of the technology disclosed herein, a maximum Control Format Indicator (CFI) value is defined for backhaul transmissions to the relay node in non-MBSFN subframes. The CFI is the number of symbols occupied by the PDCCH. CFI is allowed to be 1, 2 or 3 according to the 3GPP specifications. The significance is a maximum value may have to be imposed that is less than 3, or even less than 2.

A reason for such requirement is the required switch-time between Rx and Tx in the relay radio (illustrated, e.g., in FIG. 7 and discussed above as SW1, SW2, etc.). The relay node 29 has to transmit one symbol of mandatory signals on the access link. It then requires some time to switch to Rx before it can receive 1 or 2 symbols from donor base station node 27. The relay node 29 then requires some more switching time before it can resume transmitting on the access link in a normal fashion. Radios today have a switch-time that is a non-negligible fraction of the symbol duration. By using a timing advance TA of 1.5 symbol the relay node 29 manages to fit both switch-times and the reception of 2 backhaul symbols within the duration of 3 symbols. With this kind of switch-time the maximum value of the CFI for the backhaul link is two. Should the switch-time be substantially worse (e.g., half a symbol duration, or more) then the maximum CFI must be decreased to 1. On the other hand, with substantially improved switch-times (only a very small fraction of the symbol time) it may be possible to use a CFI maximum of three and treat the transition as a minor disturbance that is absorbed by the cyclic prefix of the symbol following immediately after the switch.

Thus, in non-MBSFN subframes where the donor eNodeB 27 transmits Physical Downlink Control Channel (PDCCH) to the relay node 29, the donor base station node 27 chooses a CFI value that is not larger than the defined maximum. The maximum can be 1, 2 or 3.

Figure 9:
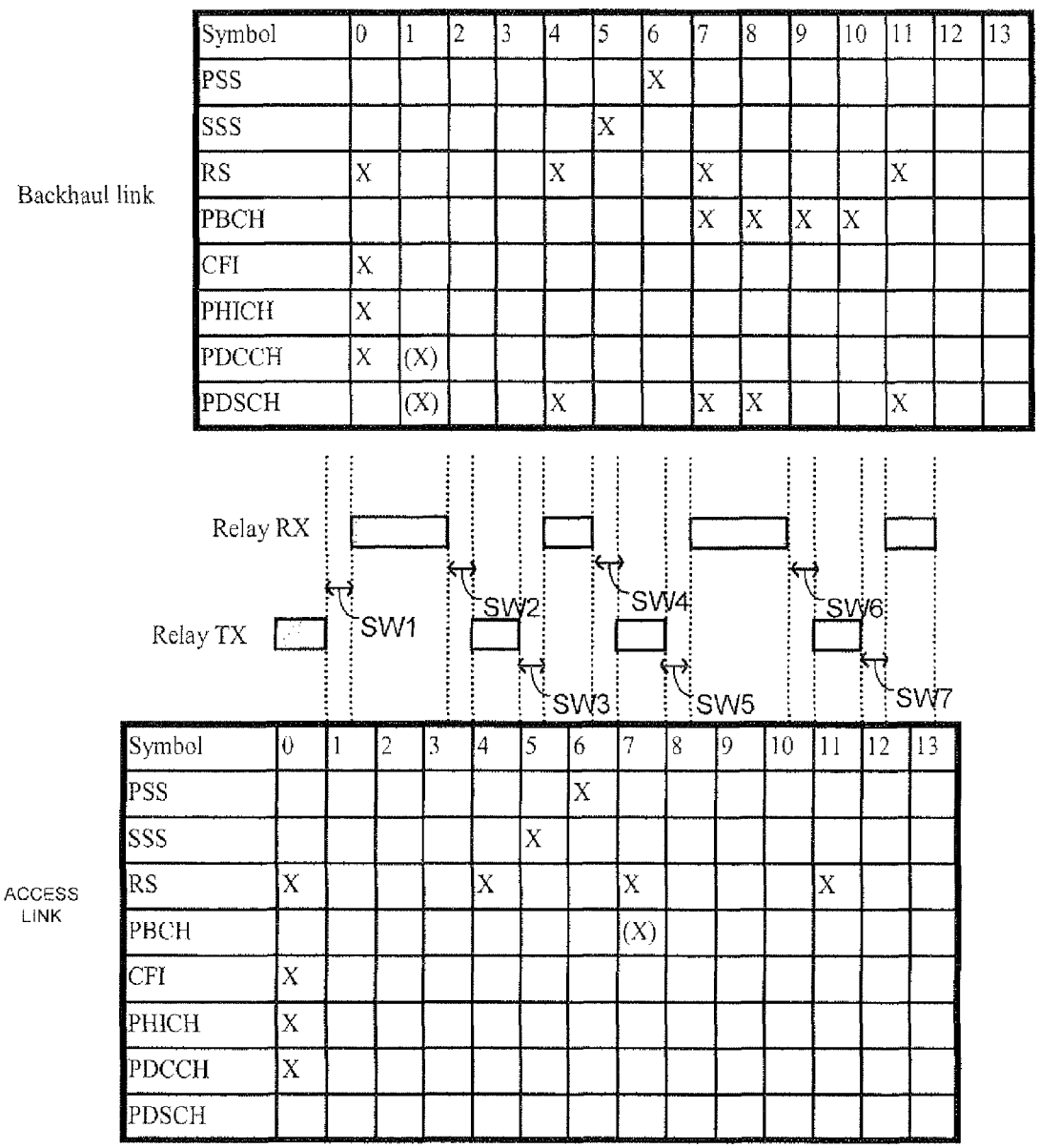
FIG. 9 is a diagrammatic view of an example TX/RX pattern in a subframe where the relay node receives both control and data while transmitting control information without interfering with itself.

As understood from FIG. 7, donor eNodeB 27 can choose not to schedule PDSCH transmissions to the relay node in DL backhaul subframes that are not MBSFN subframes. By contrast, FIG. 9 shows another example transmit (TX) and receive (RX) pattern at relay node 29 and serves as a further basis for understanding another mode of operation of relay node 29 as well as the downlink subframe coordination between donor base station node 27 and relay node 29 according to another example embodiment and mode. FIG. 9 particularly shows an example embodiment wherein Physical Downlink Shared Channel [PDSCH] transmissions are scheduled in the downlink backhaul subframes. As illustrated in representative fashion by FIG. 9, donor base station node 27 can adjust the PDSCH transmissions to the relay node in such subframes in one or more ways as described below.

Thus, FIG. 9 shows a TX/RX pattern in a subframe where the relay node 29 receives both control and data while transmitting control information without interfering with itself. In the FIG. 9 scenario, donor eNodeB 27 can map the data bits to only the OFDM symbols that the relay node 29 can receive, e.g. OFDM symbols 1, 4, 7, 8, and 11.

As understood from FIG. 9, in this embodiment the relay node 29 is configured to receive the downlink control information from the donor base station node 27 in first and second symbols of the downlink backhaul subframe; to receive a Physical Downlink Shared Channel (PDSCH channel) during selected symbols of the downlink backhaul subframe (e.g., symbols 1, 4, 7, 8, and 11 of the downlink backhaul subframe); and to transmit the downlink control information to the wireless terminal during selected symbols of the downlink access subframe (e.g., symbols 4, 7, and 11 of the downlink access subframe). In the scenario of FIG. 9, the relay node 29 transmits during a first transmit time interval, and then switches during switch time (SW1) from transmitting to receiving (to receive symbols 0 and 1 of the downlink backhaul subframe); then switches during switch time (SW2) from receiving to transmitting; transmits during a second transmit time (transmission of symbol 4 of the downlink access subframe); then switches during switch time (SW3) from transmitting to receiving; receives during a second receive time interval (receives symbol 4 of the downlink backhaul subframe); then switches during switch time (SW4) from receiving to transmitting; transmits during a third transmit time (transmission of symbol 7 of the downlink access subframe); then switches during switch time (SW5) from transmitting to receiving; receives during a third receive time interval (receives symbols 7 and 8 of the downlink backhaul subframe); then switches during switch time (SW6) from receiving to transmitting; transmits during a fourth transmit time (transmission of symbol 11 of the downlink access subframe); then switches during switch time (SW7) from transmitting to receiving; and receives during a fourth receive time interval (receives symbol 11 of the downlink backhaul subframe).

Thus, from the foregoing and FIG. 9 it is seen that, in non-MBSFN DL backhaul subframes where the relay node receives PDSCH transmissions, the transmitter of the relay node 29 is switched on during the OFDM symbols where it has to transmit the RS on the access link (e.g., the downlink access subframe), but is turned off during the other OFDM symbols.

It was mentioned above that donor base station node 27 can adjust the PDSCH transmissions to the relay node in subframes. A reason for needing such adjustment is now explained. As shown in both FIG. 7 and FIG. 9, the last two symbols on the downlink backhaul subframe (symbols 12 and 13) cannot be transmitted since they would interfere with subframes #0 and 1 in the next frame on the access link. A first way to adjust the PDSCH transmissions to the relay node is to format the Physical Downlink Shared Channel (PDSCH channel) whereby contents of the PDSCH can be entirely decoded by relay node 29 during a first part of the subframe. That is, in an example embodiment and mode, the donor base station node 27 does not schedule any data on symbols 12 and 13 of the downlink backhaul subframe. The downlink backhaul subframe is simply shortened by two symbols, which results in a slight capacity loss. The code rate can be changed to account for the fact that the donor base station node 27 cannot transmit any bits in symbols 12 and 13.

As an aside, not scheduling is preferable to use of a more robust coding scheme for the entire subframe to account for the fact that the last two symbols are lost (never transmitted), since a more robust coding scheme would not address the issue. A more robust coding scheme is not effective since each symbol is self-contained. The data in a given symbol is only present in this symbol and nowhere else. Hence, if a symbol is lost the data is lost.

In another example implementation for adjusting the PDSCH transmissions, the donor base station node is configured to adjust the interleaving of the Physical Downlink Shared Channel (PDSCH channel) whereby data of any given symbol in the PDSCH are spread over all PDSCH symbols of the subframe. To change the interleaving means that each symbol would no longer be self-contained. Instead, the data from any given symbol in the Physical Downlink Shared Channel [PDSCH] would be spread out over all PDSCH symbols in the downlink backhaul subframe. Losing one or two symbols in the subframe would then affect all data equally and could be remedied by a more powerful coding scheme containing more redundancy. There are two drawbacks to this solution: (1) a major change would be required for the 3GPP specifications and (2) interleaving the data over all symbols means that the decoder would have to wait until the end of the subframe until the decoding can begin, which is very costly time-wise. On the other hand, with the self-contained symbols, each symbol can be decoded successively as they are received.

Figure 10:
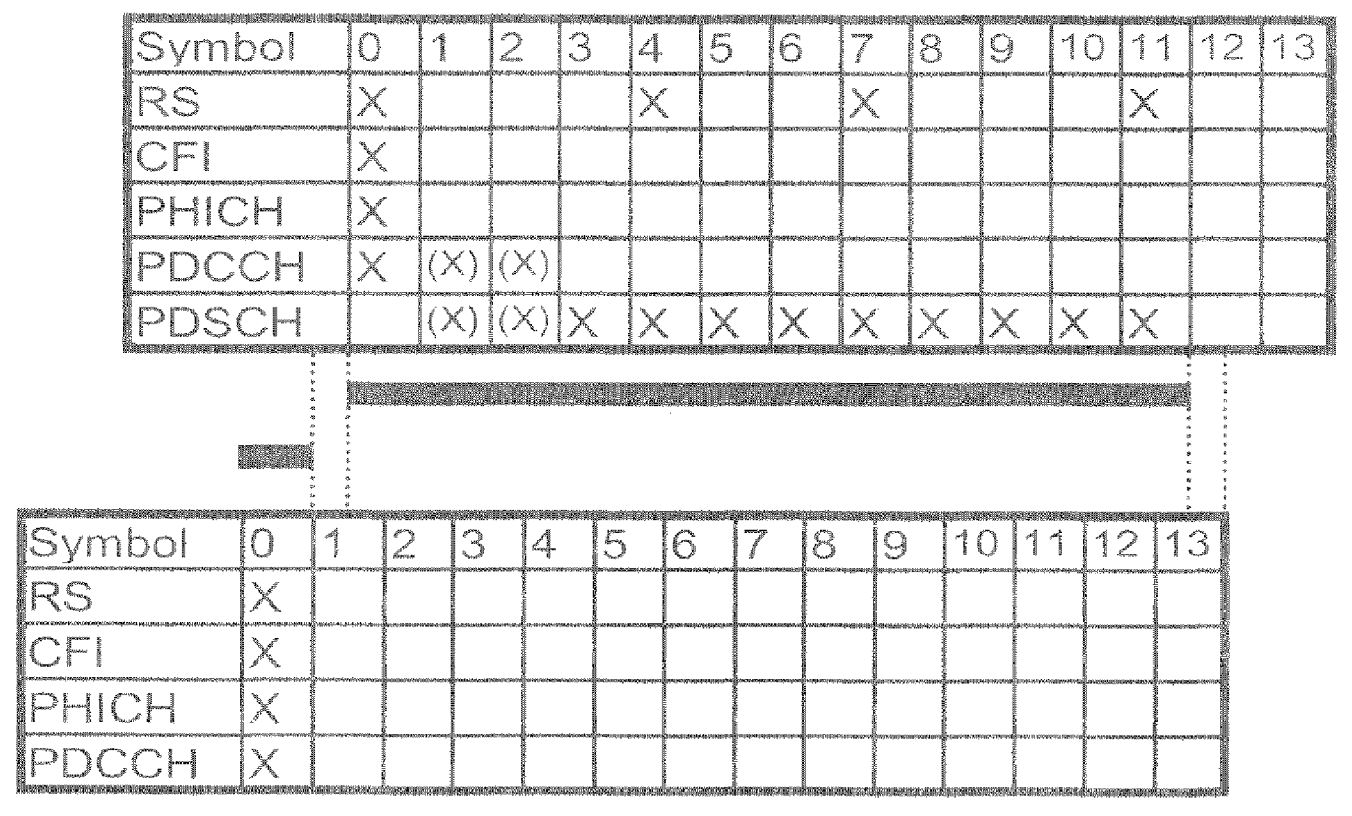

It is desirable that as many of the downlink backhaul subframes as possible be MBSFN subframes because the 3GPP standard then allows the downlink access link to transmit only the first symbol and then remain silent. Hence, with the proposed timing advance of the access link, as encompassed by the technology disclosed herein, for an MBSFN subframe the relay node 29 can then quickly shift to Rx mode and receive at least twelve of the symbols on the backhaul downlink, as illustrated in FIG. 10.

As mentioned above, the definition of the MBSFN subframe pattern is included in the System Information Block Type 2 (Specified in 3GPP document 36.331, "Radio Resource Control (RRC) Protocol Specification). In other words, it is broadcast from any eNB/DeNB/relay as part of its system information and readily available to the UEs. The ASN.1 code from the specification is included in Table 1 below for reference. In any radio frame only six of the subframes are eligible to be MBSFN. (These are subframe #: 1, 2, 3, 6, 7, 8.) This limited eligibility is due to mandatory synchronization, broadcast and paging signaling in the other four subframes. The MBSFN subframe allocation is defined by a bit pattern that covers either one frame (6 bits) or four frames (24 bits). By choosing a bit pattern over four frames a periodicity of 40 subframes (40 ms) is achieved, which can accommodate five periods of the desired eight subframe pattern.

TABLE 1

```
MBSFN-SubframeConfig ::=    SEQUENCE {
    radioframeAllocationPeriod    ENUMERATED {n1, n2, n4, n8,
n16, n32},
    radioframeAllocationOffset    INTEGER (0..7),
    subframeAllocation            CHOICE {
        oneFrame                  BIT STRING (SIZE(6)),
        fourFrames                BIT STRING (SIZE(24))
    }
}
```

Figure 11:
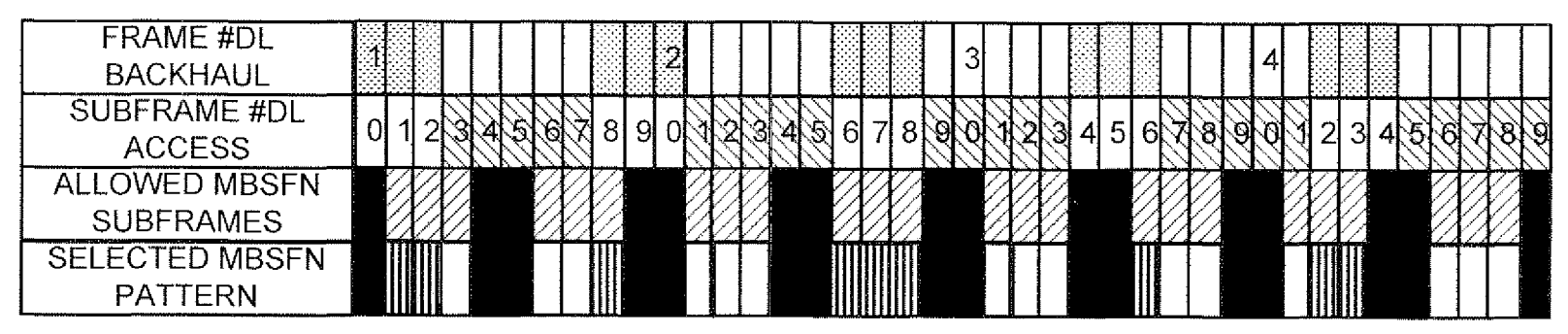

The radioframeAllocationPeriod should be chosen such that the MBSFN pattern over four frames is repeated continuously without gaps, as can be illustrated by the non-limiting example of FIG. 11. The first (top) row of FIG. 11 depicts subframe positions of downlink backhaul frames with initial subframe positions of a frame bearing an example frame number. In FIG. 11 content-bearing subframes of the downlink backhaul frames are stippled (e.g., subframes 0-2 and 8-9 of frame 1; subframes 0 and 6-8 of frame 2; subframes 4-6 of frame 3; subframes 2-4 of frame 4).

The second (next to top) row of FIG. 11 depicts subframe positions of downlink access frames, with each subframe position bearing its own subframe number within the frame to which it belongs. In FIG. 11 content-bearing subframes of the downlink access frames are hatched by lines which decline in slope from left to right (e.g., subframes 3-7 of frame 1; subframes 1-5 and 9 of frame 2; subframes 0-3 and 7-9 of frame 3; subframes 0-1 and 5-9 of frame 4).

The third row of FIG. 11 illustrates (by hatched lines which rise in slope from left to right) allowed MBSFN subframes (e.g., subframes 1-3 and 6-8 of each frame). As mentioned elsewhere, the other subframes of the third row are occupied by mandatory synchronization, broadcast, and paging signaling.

The fourth (bottom) row of FIG. 11 depicts (by horizontal hatching) selected allowable MBSFN subframes that coincide with the downlink (DL) backhaul subframes to be included in the MBSFN pattern (e.g., subframes 1, 2, and 8 of frame 1; subframes 6-8 of frame 2; subframe 6 of frame 3; and subframes 2-3 of frame 4). MBSFN subframes are desirable because then the transmission situation on the downlink (DL) is described as in FIG. 10, which is simple and leaves a lot of capacity to actual downlink (DL) backhaul transmission. Non-MBSFN subframes are depicted in FIG. 9. This situation is more complex and the DL backhaul capacity is crippled due to many mandatory signals on the DL access link that are not present in the MBSFN case.

FIG. 11 thus shows that the MBSFN pattern can be different for all four frames. Since the MBSFN subframes can be defined (according to the 3GPP specifications) with a 40 ms repetition period, i.e. over four frames, four separate bitpatterns can be used. These four frames accommodate precisely 5 repetitions of the 8 subframes long backhaul/access pattern (the stippled and hatched subframes of the top two rows) so it can be repeated without gaps and continue to support the chosen backhaul/access dichotomy in the coming frames.

The example of FIG. 11 is guided by a design choice of how much downlink (DL) backhaul capacity is needed compared to how much downlink (DL) access capacity is needed. The repetition period of 8 subframes of this pattern fits nicely with the HARQ process interval. In other embodiments these parameters can be different and/or vary.

Figure 12:
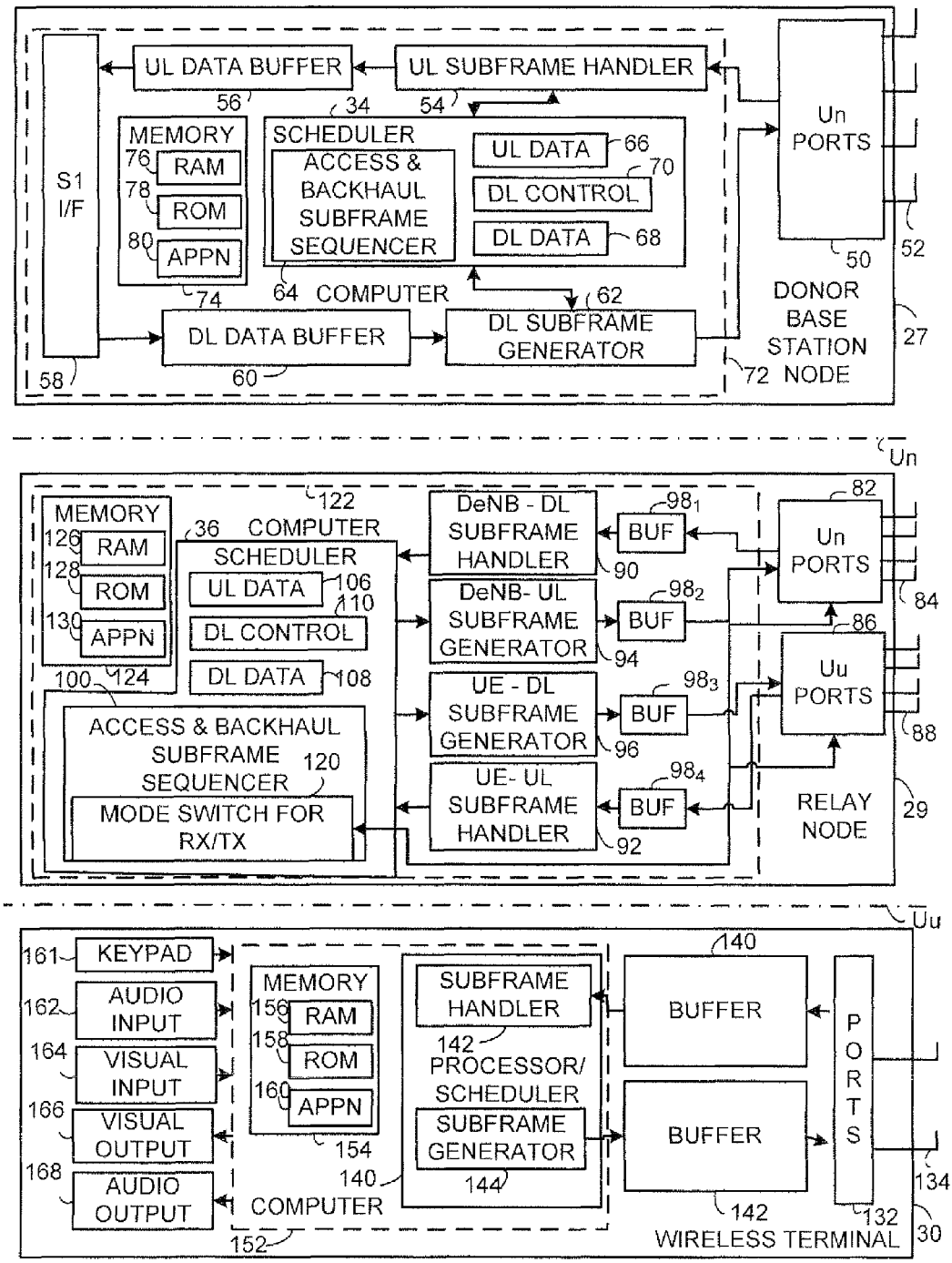
FIG. 12 is schematic view of a generic case of a relay node or self-backhauled base station node in a telecommunications network.

FIG. 12 illustrates a generic embodiment of an example relay node 29 and donor base station node 27 (e.g., self-backhauled relay node) in an example telecommunications network. As shown in FIG. 12, donor base station node 27 communicates over Un interface with relay node 29 and relay node 29 communicates over Uu interface with wireless terminal 30. To facilitate communication over the Un interface, donor base station node 27 comprises plural donor communication ports 50 which comprises or connect to plural transmission elements (antenna) 52.

Some of the ports 50 and associated transmission elements 52 are utilized for downlink transmissions; other ports 50 and associated transmission elements 52 are utilized for uplink transmissions. The uplink ports 50 are connected to uplink subframes handler 54, which in turn is connected through uplink data buffer 56 to S1 interface 58. On this uplink side of donor base station node 27, subframes received by donor base station node 27 over the Un interface are processed by uplink subframes handler 54, and data (e.g., data extracted from the uplink subframes) is stored in uplink data buffer 56 prior to being applied to S1 interface 58. The S1 interface 58 serves to forward the uplink data across the S1 interface to the core network 20, e.g., serving gateway (SGW) 24, in the manner understood with respect to FIG. 3.

On a downlink side of donor base station node 27, data received from the core network 20 through S1 interface 58 is temporarily stored in downlink data buffer 60 prior to being formatted into downlink subframes by downlink subframe generator 62. The subframes created by downlink subframe generator 62 are applied to ports 50 which are utilized for transmission to relay node 29 over the Un interface.

The aforementioned donor base station node scheduler 34 is shown in FIG. 12 as comprising, in an example, non-limiting embodiment, access and backhaul subframe sequencer 64; uplink data scheduler 66; downlink data scheduler 68; and downlink control scheduler 70. The uplink data scheduler 66, downlink data scheduler 68, and downlink control scheduler 70 all operate once per subframe. The downlink control scheduler 70 interacts with uplink data scheduler 66 and downlink data scheduler 68 but uplink data scheduler 66 and downlink data scheduler 68 generally do not interact directly with each other.

Various functional units of donor base station node 27 are provided on donor base station platform 72 which is framed by broken lines in FIG. 12. The terminology "platform" is a way of describing how the functional units of donor base station node 27 can be implemented or realized by machine One example platform 72 is a computer implementation wherein one or more of the framed elements, including donor base station node scheduler 34 and its constituent functionalities, are realized by one or more processors which execute coded instructions in order to perform the various acts described herein, including acts involved in the transmission of downlink backhaul subframes to relay node 29. In such a computer implementation the donor base station node 27 can comprise, in addition to a processor(s), memory section 74 (which in turn can comprise random access memory 76; read only memory 78; application memory 80 (which stores, e.g., coded instructions which can be executed by the processor to perform acts described herein); and any other memory such as cache memory, for example).

As shown in FIG. 12, relay node 29 communicates over Un interface with donor base station node 27 and relay node 29 communicates over Uu interface with wireless terminal 30. For communication over the Un interface, relay node 29 comprises plural relay node backhaul link communication ports 82 which comprise or connect to plural relay node backhaul link transmission elements (antenna) 84. The relay node backhaul link communication ports 82 are used for transmitting uplink backhaul subframes and receiving downlink backhaul subframes over the Un interface. For communication over the Uu interface, relay node 29 comprises plural relay node access link communication ports 86 which comprise or connect to plural relay node access link transmission elements (antenna) 88. The relay node access link communication ports 86 are used for transmitting downlink access subframes and receiving uplink access subframes over the Uu interface.

In another example implementation in which ports are shared, relay node 29 may have one set of communication ports rather than the two ports (relay node backhaul link communication ports 82 and relay node access link communication ports 86) shown in FIG. 12. In such shared port implementation, antenna ports are shared by the backhaul link and the access link. However, the situation shown in FIG. 12 with physically distinct relay node backhaul link communication ports 82 and relay node access link communication ports 86 is believed preferable for possibly reducing interference.

As further shown in FIG. 12, relay node 29 comprises two subframe handlers, e.g., subframe handler 90 and subframe handler 92. The subframe handler 90 processes frames received on a downlink over the Un interface from donor base station node 27; the subframe handler 92 processes frames received on the uplink over the Uu interface from wireless terminal 30. Both subframe handler 90 and subframe handler 92 can include operations such as deformatting and decoding the data which reside in the received subframes. The relay node 29 also comprises two subframe generators, e.g., subframe generator 94 and subframe generator 96. The subframe generator 94 prepares uplink backhaul subframes for transmission over the Un interface to donor base station node 27, including re-encoding data received over the Uu interface and now to be included in the uplink backhaul subframes. The subframe generator 96 prepares downlink access subframes for transmission over the Uu interface to wireless terminal 30, including re-encoding data received over the Un interface and now to be included in the downlink access subframes. FIG. 12 further shows that each of subframe handler 90, subframe handler 92, subframe generator 94, and subframe generator 96 are connected through a respective buffer $98_1$-$98_4$ to the appropriate port of relay node 29, e.g., either to relay node backhaul link communication ports 82 or relay node access link communication ports 86.

The aforementioned relay node scheduler 36 is shown in FIG. 12 as comprising, in an example, non-limiting embodiment, relay node access and backhaul subframe sequencer 100; relay node uplink data scheduler 106; relay node downlink data scheduler 108; and relay node downlink control scheduler 110. The relay node uplink data scheduler 106, relay node downlink data scheduler 108, and relay node downlink control scheduler 110 all operate once per subframe. The relay node downlink control scheduler 110 interacts with relay node uplink data scheduler 106 and relay node downlink data scheduler 108 but relay node uplink data scheduler 106 and relay node downlink data scheduler 108 generally do not interact directly with each other.

As shown in FIG. 12, the relay node access and backhaul subframe sequencer 100 comprises mode switch 120, which is responsible for switching operation of relay node 29 between a transmission interval (for transmitting one or more symbols on the downlink access subframe over interface Uu to wireless terminal 30) and a receive interval (for receiving one or more symbols on the downlink backhaul subframe over interface Un from donor base station node 27). The element wise multiplication unit 120 thus operates in order to carry out the mode switching described, for example, with reference to FIG. 7 and FIG. 9.

Various functional units of relay node 29 are provided on relay node platform 122 which is framed by broken lines in FIG. 12. As with donor base station node 27, the terminology "platform" is a way of describing how the functional units of relay node 29 can be implemented or realized by machine One example platform 122 is a computer implementation wherein one or more of the framed elements, including relay node scheduler 36 and its constituent functionalities, are realized by one or more processors which execute coded instructions in order to perform the various acts described herein, including acts involved in the transmission of downlink access subframes to wireless terminal 30 and reception of downlink backhaul subframes from donor base station node 27. In such a computer implementation the relay node 29 can comprise, in addition to a processor(s), memory section 124 (which in turn can comprise random access memory 126; read only memory 128; application memory 130 (which stores, e.g., coded instructions which can be executed by the processor to perform acts described herein); and any other memory such as cache memory, for example).

As shown in FIG. 12, wireless terminal 30 communicates over Uu interface with relay node 29. For communication over the Uu interface, wireless terminal 30 comprises one or more communication ports 132 (which comprise or connect to transmission element(s) (antenna) 134). The wireless terminal 30 further comprises wireless terminal subframe processor/scheduler 140 which in turn comprises downlink subframe handler 142 and uplink subframe generator 144. The downlink subframe handler 142 processes, e.g., decodes, subframes such as downlink access subframes and MBSFN subframes received from relay node 29. The uplink subframe generator 144 generates the uplink access subframes which are sent from wireless terminal 30 to relay node 29.

Various functional units of wireless terminal 30 are provided on terminal platform 152 which is framed by broken lines in FIG. 12. As with donor base station node 27 and relay node 29, the terminology "platform" is a way of describing how the functional units of wireless terminal 30 can be implemented or realized by machine One example platform 152 is a computer implementation wherein one or more of the framed elements, including wireless terminal subframe scheduler 140 and its constituent functionalities, are realized by one or more processors which execute coded instructions in order to perform the various acts described herein, including acts involved in the transmission of uplink access subframes to relay node 29 and reception of downlink access subframes from relay node 29. In such a computer implementation wireless terminal 30 can comprise, in addition to a processor(s), memory section 154 (which in turn can comprise random access memory 156; read only memory 158; application memory 160 (which stores, e.g., coded instructions which can be executed by the processor to perform acts described herein); and any other memory such as cache memory, for example).

Typically the wireless terminal 30 also comprises certain input/output units or functionalities, the representative input/output units for wireless terminal 30 being illustrated in FIG. 12 as keypad 161; audio input device (e.g. microphone) 162; visual input device (e.g., camera) 164; visual output device (e.g., display 166); and audio output device (e.g., speaker) 168. Other types of input/output devices can also be connected to or comprise wireless terminal 30.

In the example of FIG. 12 the platforms 72, 122, and 152 have been illustrated as computer-implemented or computer-based platforms. Another example platform suitable for any of donor base station node 27, relay node 29 or wireless terminal 30 is that of a hardware circuit, e.g., an application specific integrated circuit (ASIC) wherein circuit elements are structured and operated to perform the various acts described herein.

The schedulers of donor base station node 27 and relay node 29, e.g., donor base station node scheduler 34 and relay node scheduler 36, respectively, must have a common view of what subframes are available for backhaul and what are available for access, both for downlink transmission and for uplink transmission. This is what is meant herein with respect to "pattern", as in subframe patterns such as the first pattern and the second pattern previously mentioned, for example. These patterns are used by the schedulers. The donor base station node scheduler 34 of donor base station node 27 uses the patterns (e.g., the first pattern) to determine when the relay node 29 can be scheduled (e.g., when a downlink backhaul subframe can be scheduled for transmission to the relay node 29). The relay node scheduler 36 of relay node 29 uses the patterns (e.g., the first pattern) to determine when relay node 29 can schedule to send subframes, e.g., downlink access subframes, to wireless terminal 30.

The subframe pattern(s), e.g., one or more of the first pattern and the second pattern, could be determined and/or communicated in various ways. As a first way illustrated in FIG. 13-1, the subframe pattern(s) can be fixed and specified in the standard, and as such may be pre-programmed or hard coded into the schedulers. As a second way, the subframe pattern(s) can be signaled between donor base station node 27 and relay node 29. For instance, donor base station node 27 could tell relay node 29 what pattern to use (as illustrated in FIG. 13-2) or vice versa (as illustrated in FIG. 13-3), or there could be some kind of negotiation between donor base station node 27 and relay node 29 to ascertain or determine an optimum or workable pattern(s) as illustrated in FIG. 13-4. This signaling can be done, for example, in the radio resource control (RRC) layer, using a signaling radio bearer (SRB) that is transmitted over the backhaul air interface. As a third way illustrated in FIG. 13-5, the subframe pattern(s) can be signaled from some other node, e.g. a node external to donor base station node 27 and relay node 29 such as a management node that controls configuration parameters in both donor base station node 27 and relay node 29. In the case of relay node 29 such configuration data can be contained in IP packets that are transmitted over the backhaul air interface, for example.

It will be understood that foregoing example three ways of determining/communicating the subframe pattern(s) are also suitable for determining and communicating other parameters such as the maximum CFI value and the downlink timing advance (TA).

The technology disclosed herein thus provides new downlink backhaul subframes which are not MBSFN subframes on the access link, and these new downlink backhaul subframes are "mixed" downlink subframes which are handled in a special way. In (e.g. during) such a mixed downlink subframe, the relay node 29 must both receive downlink control over the backhaul link and transmit downlink control over the access link. If donor base station node 27 schedules the relay node 29 in a mixed downlink subframe, the CFI (control format indicator) must be kept below a maximum value that may be lower than three (the normal value range for CFI is 1-3). The relay node 29 must choose Control Format Indicator [CFI] to be 1 or 2 in mixed downlink subframes. The relay node 29 cannot transmit Physical Downlink Shared Channel [PDSCH] data in mixed downlink subframes. The donor base station node 27 may transmit a modified Physical Downlink Shared Channel [PDSCH] to relay node 29 in a mixed subframe, where some of the OFDM symbols are left out, and the rate matching is adjusted accordingly.

It should be understood that, for a donor base station node 27 that has multiple relay nodes connected, the subframe pattern and maximum CFI need not be the same across all such connected relay nodes. In fact, it can be advantageous in some example embodiments to have different such patterns, since then the donor base station node 27 may use the backhaul link to one relay node while another relay node uses its access link.

The technology disclosed herein addresses and solves various problems. One solved problem is that the 8 subframe periodic transmission structure does not fit well with the possible MBSFN subframe patterns. In particular, if a particular subframe is marked as MBSFN (which enables the relay node to receive downlink transmissions on backhaul in those subframes), then there will be other subframes $8k$ (for integer k) subframes later that cannot be marked as MBSFN, but for those subframes it would be desired to have them as downlink subframes on the backhaul, to support the 8 ms periodic transmission structure. In TDD systems the HARQ timing is specific to the chosen TDD configuration. It does not strictly follow the 8 ms period but a pre-defined pattern. However, the technology disclosed herein (e.g., including switching between Tx and Rx mode within a regular non-MBSFN subframe) can be applied to re-use the pre-defined 3GPP Rel.8 timing patterns for the backhaul and the access link of a relay-enhanced system. The application to TDD systems follows the same principle as in FDD, so it is not separately illustrated in the present discussion.

Thus, the technology disclosed herein allows the introduction of a relay node with limited impact on the LTE air interface. In particular, it allows the relay node to use the Release 8 HARQ transmission scheme without changes on both the backhaul and access links, without causing self-interference between transmission and reception in the relay node. This gives good compatibility with Release 8 UEs without decreasing performance, and an interface between donor eNodeB and relay node that is very similar to Release 8, making it simple to specify and implement.

The mode switching, frame generation/processing, and other operations described herein can be implemented in appropriate nodes and/or network structures by a computer, processor, or controller, and as such may be provided through the use of dedicated hardware as well as hardware capable of executing software in the form of coded instructions stored on computer-readable medium. A computer is generally understood to comprise one or more processors and/or controllers, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

Abbreviations:
LTE Long-Term Evolution
MBSFN Multicast/Broadcast Single-Frequency Network
DL Downlink
UL Uplink
PUSCH Physical Uplink Shared Channel
PUCCH Physical Uplink Control Channel
OFDM Orthogonal Frequency-Division Multiplexing
CFI Control Format Indicator
PDCCH Physical Downlink Control Channel
RS Reference Signal
PHICH Physical Hybrid ARQ Indicator Channel
PSS Primary Synchronization Signal
SSS Secondary Synchronization Signal
PBCH Physical Broadcast Channel
PDSCH Physical Downlink Shared Channel
HARQ Hybrid Automatic Request for Retransmission Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A radio access network comprising:
a donor base station node;
a relay node;
wherein the relay node is configured to communicate using backhaul subframes over a Un radio interface with the donor base station node and to communicate using access subframes over a Uu radio interface with a wireless terminal;
wherein a beginning of a selected downlink access subframe communicated from the relay node to the wireless terminal over the Uu radio interface precedes a beginning of a next-in-time downlink backhaul subframe communicated from the donor base station node to the relay node over the Un radio interface by a downlink timing advance, downlink backhaul subframes and downlink access subframes being transmitted using a same frequency band over an air interface; and
wherein the relay node is configured both to receive downlink control information from the donor base station node and to transmit downlink control information to the wireless terminal during the downlink backhaul subframe;
wherein plural downlink backhaul subframes and plural downlink access subframes occur in a first pattern known both to the relay node and the donor base station node and wherein the pattern is periodic, and has a period of eight subframes; and
wherein the relay node is further configured to communicate using unlink backhaul subframes over the Un radio interface with a donor base station node and to communicate using uplink access subframes over the Uu radio interface with the wireless terminal, wherein plural uplink backhaul subframes and plural unlink access subframes occur in a second pattern in a second frequency band over the air interface, and wherein the second pattern is a time shift of the first pattern.

2. A donor base station node of a radio access network, the donor base station node being configured to communicate using downlink backhaul subframes including downlink control information over a Un radio interface with a relay node, the downlink backhaul subframes belonging to a first pattern comprising plural downlink backhaul subframes and plural downlink access subframe, the plural downlink access frames being transmitted by the relay node over a Uu radio interface with a wireless terminal in a manner whereby a beginning of a selected downlink access subframe communicated from the relay node to the wireless terminal over the Uu radio interface precedes a beginning of a next-in-time downlink backhaul subframe communicated from the donor base station node to the relay node over the Un radio interface by a downlink timing advance, downlink backhaul subframes and downlink access subframes being transmitted using a same frequency band over an air interface; the donor base station node being configured to coordinate transmission of the downlink backhaul subframes according to the first pattern with the relay node;
wherein plural downlink backhaul subframes and plural downlink access subframes occur in a first pattern known both to the relay node and the donor base station node and wherein the pattern is periodic, and has a period of eight subframes; and
wherein the relay node is further configured to communicate using uplink backhaul subframes over the Un radio interface with a donor base station node and to communicate using unlink access subframes over the Uu radio interface with the wireless terminal, wherein plural uplink backhaul subframes and plural unlink access subframes occur in a second pattern in a second frequency band over the air interface, and wherein the second pattern is a time shift of the first pattern.

3. The apparatus of claim 2, wherein the donor base station node comprises:
- a donor base station node scheduler configured to operate the donor base station node in accordance with the first pattern;
- a donor base station node subframe handler configured to process uplink subframes received from the relay node;
- a donor base station node subframe generator configured to generate the downlink backhaul subframes which include downlink control information which is to be transmitted to the relay node.

4. A relay node of a radio access network, the relay node being configured to communicate using backhaul subframes over a Un radio interface with a donor base station node and to communicate using access subframes over a Uu radio interface with a wireless terminal, wherein a beginning of a selected downlink access subframe communicated from the relay node to the wireless terminal over the Uu radio interface precedes a beginning of a next-in-time downlink backhaul subframe communicated from the donor base station node to the relay node over the Un radio interface by a downlink timing advance, downlink backhaul subframes and downlink access subframes being transmitted using a same frequency band over an air interface, and wherein the relay node is configured both to receive downlink control information from the donor base station node and to transmit downlink control information to the wireless terminal during the downlink backhaul subframe;
- wherein plural downlink backhaul subframes and plural downlink access subframes occur in a first pattern known both to the relay node and the donor base station node and wherein the pattern is periodic, and has a period of eight subframes; and
- wherein the relay node is further configured to communicate using uplink backhaul subframes over the Un radio interface with a donor base station node and to communicate using unlink access subframes over the Uu radio interface with the wireless terminal, wherein plural uplink backhaul subframes and plural unlink access subframes occur in a second pattern in a second frequency band over the air interface, and wherein the second pattern is a time shift of the first pattern.

5. The radio access network or relay node of claim 1 or claim 2 or claim 4, wherein the downlink control information received by the relay node from the donor base station node during the downlink backhaul subframe comprises a control format indicator (CFI) and a Physical Downlink control Channel (PDCCH), and wherein the CFI specifies the number of symbols occupied by the PDCCH.

6. The radio access network or relay node of claim 1 or claim 2 or claim 4, wherein the downlink control information received by the relay node from the donor base station node during the downlink backhaul subframe further comprises a reference signal (RS) and a Physical Hybrid ARQ Indicator Channel (PHICH).

7. The radio access network or relay node of claim 1 or claim 4, wherein the relay node is configured to transmit a reference signal (RS) and a control format indicator (CFI) to the wireless terminal during the timing advance, and wherein the CFI specifies the number of symbols occupied by a Physical Downlink control Channel (PDCCH).

8. The radio access network or relay node of claim 1 or claim 4, wherein the relay node is configured to receive the downlink control information from the donor base station node in first and second symbols of the downlink backhaul subframe and subsequently to transmit the downlink control information to the wireless terminal during symbols of the downlink access subframe.

9. The radio access network or relay node of claim 1 or claim 4, wherein the relay node is configured to receive the downlink control information from the donor base station node in first and second symbols of the downlink backhaul subframe; to receive a Physical Downlink Shared Channel (PDSCH channel) during selected symbols of the downlink backhaul subframe; and to transmit the downlink control information to the wireless terminal during selected symbols of the downlink access subframe.

10. The radio access network or relay node of claim 1 or claim 4, wherein the relay node is configured to format the Physical Downlink Shared Channel (PDSCH channel) whereby contents of the PDSCH can be entirely decoded during a first part of the subframe.

11. The radio access network or relay node of claim 1 or claim 4, wherein the relay node is configured to adjust interleaving of the Physical Downlink Shared Channel (PDSCH channel) whereby data of any given symbol in the PDSCH are spread over all PDSCH symbols of the subframe.

12. The radio access network or relay node of claim 1 or claim 4, wherein the relay node comprises:
- a relay node scheduler configured to operate the relay node in accordance with a pattern of plural downlink backhaul subframes and plural downlink access subframes;
- a relay node subframe handler configured to process the downlink control information received from the donor base station node during the downlink backhaul subframe;
- a relay node subframe generator configured to generate the downlink access subframe to include the downlink control information which is to be transmitted to the wireless terminal in selected symbols of the downlink access subframe during the downlink backhaul subframe.

13. The radio access network or relay node of claim 5, wherein a value of the timing advance is chosen to accommodate a first predetermined number of downlink backhaul symbols and two switch times in a second predetermined number of symbols of the downlink backhaul subframe, and wherein a value of the CFI specifies the first predetermined number.

14. The radio access network or relay node of claim 5, wherein the timing advance is 1.5 (OFDM) symbols and the value of CFI is two.

15. The radio access network or relay node of claim 8, wherein the relay node is configured to transmit a reference signal (RS), synchronization signal, and a Physical Broadcast Channel (PBCH) during the downlink access subframe.

16. A method of operating a radio access network (RAN) comprising a donor base station node and a relay node and wherein the relay node is configured to communicate using downlink backhaul subframes over a Un radio interface with the donor base station node and to communicate using downlink access subframes over a Uu radio interface with a wireless terminal, the method comprising:
- transmitting the downlink backhaul subframes and the downlink access subframes over an air interface using a same frequency band;
- providing a downlink timing advance between a beginning of a selected downlink access subframe communicated from the relay node to the wireless terminal over the Uu radio interface and a beginning of a next-in-time downlink backhaul subframe communicated from the donor base station node to the relay node over the Un radio interface; and configuring the relay node both to receive downlink control information from the donor base station node and to transmit downlink control information to the wireless terminal during the downlink backhaul subframe;

wherein plural downlink backhaul subframes and plural downlink access subframes occur in a first pattern known both to the relay node and the donor base station node and wherein the pattern is periodic, and has a period of eight subframes; and wherein the relay node is further configured to communicate using unlink backhaul subframes over the Un radio interface with a donor base station node and to communicate using uplink access subframes over the Uu radio interface with the wireless terminal, wherein plural unlink backhaul subframes and plural uplink access subframes occur in a second pattern in a second frequency band over the air interface, and wherein the second pattern is a time shift of the first pattern.

17. The method of claim 16, further comprising coordinating in both the relay node and the donor base station node a first predetermined pattern of plural downlink backhaul subframes and plural downlink access subframes.

18. The method of claim 17, coordinating the first predetermined pattern by preconfiguring the relay node and the donor base station node with the first predetermined pattern.

19. The method of claim 17, coordinating the first predetermined pattern by signaling the first predetermined pattern between the relay node and the donor base station node.

20. The method of claim 17, coordinating the first predetermined pattern by signaling the first predetermined pattern to the relay node and the donor base station node from another node.

* * * * *

UNITED STATES PATENT AND TRADEMARK OFFICE
CERTIFICATE OF CORRECTION

PATENT NO. : 9,014,079 B2
APPLICATION NO. : 12/712413
DATED : April 21, 2015
INVENTOR(S) : Wiberg et al.

It is certified that error appears in the above-identified patent and that said Letters Patent is hereby corrected as shown below:

On the Title Page, in Item (56), under "OTHER PUBLICATIONS", in Column 2, Lines 1-2, delete "far Relaying, Ericcson" and insert -- for Relaying, Ericsson --, therefor.

On the Title Page, in Item (57), under "ABSTRACT", in Column 2, Line 3, delete "base (27) station" and insert -- base station (27) --, therefor.

IN THE DRAWINGS

Figure 2:
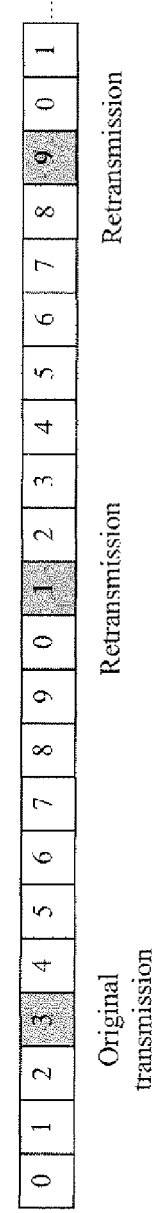
FIG. 2 is a diagrammatic view of frames having 8 ms period in uplink transmissions.

In Fig. 1, Sheet 1 of 12, delete "S-SW" and insert -- SGW --, therefor.

IN THE SPECIFICATION

In Column 1, Line 13, delete "networks" and insert -- networks. --, therefor.

In Column 3, Line 65, delete "terminal" and insert -- terminal. --, therefor.

In Column 6, Line 39, delete "is" and insert -- is a --, therefor.

In Column 16, Line 62, delete "machine" and insert -- machine. --, therefor.

In Column 18, Line 24, delete "machine" and insert -- machine. --, therefor.

In Column 18, Line 58, delete "machine" and insert -- machine. --, therefor.

In Column 20, Lines 45-46, delete "non-MB SFN" and insert -- non-MBSFN --, therefor.

IN THE CLAIMS

In Column 22, Line 25, in Claim 1, delete "unlink" and insert -- uplink --, therefor.

Signed and Sealed this
First Day of March, 2016

Michelle K. Lee
*Director of the United States Patent and Trademark Office*

CERTIFICATE OF CORRECTION (continued)
U.S. Pat. No. 9,014,079 B2

IN THE CLAIMS

In Column 22, Line 29, in Claim 1, delete "unlink" and insert -- uplink --, therefor.

In Column 22, Line 62, in Claim 2, delete "unlink" and insert -- uplink --, therefor.

In Column 22, Line 64, in Claim 2, delete "unlink" and insert -- uplink --, therefor.

In Column 23, Line 42, in Claim 4, delete "unlink" and insert -- uplink --, therefor.

In Column 23, Line 44, in Claim 4, delete "unlink" and insert -- uplink --, therefor.

In Column 24, Line 60, in Claim 16, delete "Uu" and insert -- Un --, therefor.

In Column 25, Line 15, in Claim 16, delete "unlink" and insert -- uplink --, therefor.

In Column 25, Line 19, in Claim 16, delete "unlink" and insert -- uplink --, therefor.